United States Patent
Chen et al.

(10) Patent No.: US 11,372,123 B2
(45) Date of Patent: Jun. 28, 2022

(54) METHOD FOR DETERMINING CONVERGENCE IN FULL WAVEFIELD INVERSION OF 4D SEISMIC DATA

(71) Applicant: ExxonMobil Upstream Research Company, Spring, TX (US)

(72) Inventors: Ganglin Chen, Kuala Lumpur (MY); Musa Maharramov, The Woodlands, TX (US); David H. Johnston, Houston, TX (US); Partha Routh, Katy, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/948,719

(22) Filed: Sep. 29, 2020

(65) Prior Publication Data

US 2021/0103064 A1    Apr. 8, 2021

Related U.S. Application Data

(60) Provisional application No. 62/911,437, filed on Oct. 7, 2019.

(51) Int. Cl.
  *G01V 1/28* (2006.01)
  *G01V 1/30* (2006.01)
(52) U.S. Cl.
  CPC .............. *G01V 1/282* (2013.01); *G01V 1/306* (2013.01); *G01V 1/308* (2013.01); *G01V 2210/622* (2013.01)
(58) Field of Classification Search
  CPC ........ G01V 1/282; G01V 1/306; G01V 1/308; G01V 2210/622
  See application file for complete search history.

(56) References Cited

U.S. PATENT DOCUMENTS 4,969,130 A    11/1990  Cameron et al.
5,870,690 A    2/1999   Frenkel et al.
(Continued)

FOREIGN PATENT DOCUMENTS

WO    2008087174    7/2008
WO    2009027420    3/2009
WO    2013159810    10/2013

OTHER PUBLICATIONS

Chen, G. et al. (2015) "Application of Full Wavefield Inversion to Deepwater 4D Seismic Surveys—Workflow and Analysis of the Results", Tu N101 11, 77th EAGE Conference and Exhibition 2015, IFEMA, Madrid, Spain, Jun. 1-4, 2015, 5pgs.

(Continued)

*Primary Examiner* — Raymond L Nimox
(74) *Attorney, Agent, or Firm* — ExxonMobil Upstream Research Company—Law Department

(57) ABSTRACT

Provided is a method for determining convergence in full wavefield inversion (FWI) of 4D seismic (time-lapse seismic: 3D seismic surveys acquired at different times with the first survey termed as the baseline and subsequent surveys termed as monitors). FWI applied to field seismic data includes iteratively solving for subsurface property models and model difference between monitor and baseline. Iteration occurs until the model difference is sufficiently converged. Rather than determining convergence by examining an entire subsurface region of the models and/or the model difference, subparts of the subsurface region models and/or the model difference are examined in order to determine convergence. For example, different regions behave differently, include the target reservoir region (where hydrocarbon is present) and the background region that is outside the target reservoir region. Thus, transforming the subregions of the models and/or the model difference and analyzing the (Continued)

transformations may indicate convergence of the overall model difference.

22 Claims, 13 Drawing Sheets

(56) References Cited

U.S. PATENT DOCUMENTS

| | | | |
|---|---|---|---|
| 5,873,051 | A | 2/1999 | Van Bemmel et al. |
| 5,878,372 | A | 3/1999 | Tabarovsky et al. |
| 5,905,657 | A | 5/1999 | William et al. |
| 6,125,330 | A | 9/2000 | Anders et al. |
| 6,266,619 | B1 | 7/2001 | Jacob et al. |
| 6,356,844 | B2 | 3/2002 | Thomas et al. |
| 6,529,833 | B2 | 3/2003 | Fanini et al. |
| 6,715,551 | B2 | 4/2004 | Curtis et al. |
| 6,826,483 | B1 | 11/2004 | Anderson et al. |
| 6,886,632 | B2 | 5/2005 | Raghuraman et al. |
| 6,980,940 | B1 | 12/2005 | Gurpinar et al. |
| 7,027,354 | B2 | 4/2006 | Cole et al. |
| 7,079,952 | B2 | 7/2006 | Thomas et al. |
| 7,242,637 | B2 | 7/2007 | Van Den Beukel et al. |
| 7,523,003 | B2 | 4/2009 | Anders et al. |
| 7,636,275 | B2 | 12/2009 | Anno et al. |
| 7,782,709 | B2 | 8/2010 | Esmersoy |
| 8,095,345 | B2 | 1/2012 | Hoversten |
| 8,255,166 | B2 | 8/2012 | Tonellot et al. |
| 8,437,998 | B2 | 5/2013 | Routh et al. |
| 8,483,964 | B2 | 7/2013 | Chu |
| 8,537,638 | B2 | 9/2013 | Lee et al. |
| 10,379,244 | B2 * | 8/2019 | Blanchard ............... G01V 1/308 |
| 2003/0043693 | A1 | 3/2003 | Eastwood et al. |
| 2003/0046006 | A1 | 3/2003 | Eastwood et al. |
| 2006/0153005 | A1 | 7/2006 | Herwanger et al. |
| 2007/0005253 | A1 | 1/2007 | Fornel et al. |
| 2007/0255500 | A1 | 11/2007 | Pita et al. |
| 2007/0255545 | A1 | 11/2007 | Pita et al. |
| 2008/0033656 | A1 | 2/2008 | Harwanger |
| 2008/0291781 | A1 | 11/2008 | Williamson et al. |
| 2010/0161232 | A1 | 6/2010 | Ganglin et al. |
| 2010/0198638 | A1 | 8/2010 | Max et al. |
| 2010/0254217 | A1 | 10/2010 | Dezhi et al. |
| 2010/0312534 | A1 | 12/2010 | Shiyu et al. |
| 2011/0002194 | A1 | 1/2011 | Matthias et al. |
| 2012/0073825 | A1 | 3/2012 | Partha et al. |
| 2012/0143506 | A1 | 6/2012 | Partha et al. |
| 2013/0003500 | A1 | 1/2013 | Ramesh et al. |
| 2013/0229892 | A1 | 9/2013 | Skjei et al. |
| 2013/0250726 | A1 | 9/2013 | Frydman et al. |
| 2013/0289879 | A1 * | 10/2013 | Grandi ............... G01V 1/30 702/6 |
| 2013/0297273 | A1 | 11/2013 | Altundas et al. |
| 2014/0019056 | A1 | 1/2014 | Thore |
| 2015/0012221 | A1 | 1/2015 | Bansal et al. |
| 2015/0012256 | A1 | 1/2015 | Partha et al. |
| 2015/0057938 | A1 | 2/2015 | Christine et al. |
| 2015/0120196 | A1 | 4/2015 | Weichang et al. |
| 2016/0097870 | A1 | 4/2016 | Partha et al. |
| 2017/0010373 | A1 | 1/2017 | Gboyega et al. |
| 2017/0176613 | A1 | 6/2017 | William et al. |
| 2017/0205521 | A1 * | 7/2017 | Thore ............... G01V 1/308 |
| 2017/0205522 | A1 * | 7/2017 | Thore ............... G01V 1/308 |
| 2018/0156932 | A1 | 6/2018 | Sain |
| 2018/0275303 | A1 * | 9/2018 | Zhan ............... G01V 1/303 |
| 2020/0132873 | A1 | 4/2020 | Haiyang et al. |
| 2020/0348434 | A1 * | 11/2020 | Zhang ............... G01V 1/306 |
| 2021/0103064 | A1 | 4/2021 | Ganglin et al. |

OTHER PUBLICATIONS

Johnston, D.H. (2013) "Practical Applications of Time-Lapse Seismic Data: 2013 Distinguished Instructor Short Course", Society of Exploration Geophysics, ISBN 156080307X, 9781560803072, pp. 4-8.

Lazaratos, S., I. et al. (2011) "Improving the Convergence Rate of Full Wavefield Inversion Using Spectral Shaping", 81st Annual International Meeting, SEG-2011-2428, SEG Technical Program Expanded Abstracts, vol. 30, doi:10.1190/1.3627696, pp. 2428-2432.

Maharramov, M., and B. L. Biondi (2014) "Joint Full-Waveform Inversion of Time-Lapse Seismic Data Sets", 84th Annual International Meeting, SEG, Expanded Abstracts, pp. 954-959.

Plessix, R-É., and Y. Li (2013) "Waveform Acoustic Impedance Inversion with Spectral Shaping", Geophysical Journal International, vol. 195, Issue 1, Oct. 1, 2013, pp. 301-314.

Routh, P., G. et al. (2012) "Full Wavefield Inversion of Time-Lapse Data for Improved Imaging and Reservoir Characterization", SEG Technical Program Expanded Abstracts 2012, DOI: 10.1190/segam2012-1043.1, pp. 1-6.

Zhan, X. et al. (2017) "4D Time Shift and Amplitude Versus Offset Joint (AVO) Inversion", SEG Technical Program Expanded Abstracts 2017; DOI: 10.1190/segam2017-17737635.1, pp. 5855-5859.

Musa Maharramov, et al., "Time-lapse inverse theory with applications", Geophysics, (2016), pp. R485-R501, vol. 81, No. 6.

* cited by examiner

METHOD FOR DETERMINING CONVERGENCE IN FULL WAVEFIELD INVERSION OF 4D SEISMIC DATA

CROSS REFERENCE TO RELATED APPLICATION

This application claims the priority of U.S. Provisional Application Ser. No. 62/911,437, filed Oct. 7, 2019, the disclosure of which is incorporated herein by reference in its entirety.

TECHNICAL FIELD

The technical field relates to geophysical prospecting, such as geophysical data processing used for prospecting. More specifically, the technical field relates to a method for determining convergence in full wavefield inversion of 4D seismic data.

BACKGROUND 4D seismic, also called time-lapse seismic, refers to 3D seismic surveys acquired at different times over a subsurface region, which typically includes hydrocarbon reservoirs. The first survey may be termed as the baseline and subsequent surveys may be termed as monitors. The differences in the amplitudes and travel times between survey seismic images (called the 4D or time-lapse seismic difference) contain information about changes in subsurface saturation, pressure, and other reservoir properties that result from hydrocarbon production. Given an earth model of these properties and their changes, rock physics theory may be used to construct an earth model of seismic properties such as the compressional wave (P-wave) velocity Vp, the shear wave (S-wave) velocity Vs, and density. Conversely, measured 4D seismic differences may be inverted to obtain the changes in the seismic properties which can, in turn, be related to the changes in reservoir properties. Two 4D seismic difference attributes are usually calculated: 4D seismic amplitude difference and 4D seismic time shift. The former relates to the changes in acoustic impedance (Vp× density) and the latter, the changes in the velocity (Vp). Traditionally, seismic inversion is performed on migrated seismic stacks (post-stack inversion). These inversion methods typically assume that the seismic data have been fully processed so that they represent true amplitude variations. Furthermore, it is generally assumed that wave propagation can be represented by convolution; time shifts between baseline and monitor surveys are usually treated as vertical with more sophisticated methods accounting for the time shifts of angle stacks.

Advances in Full Wavefield Inversion (FWI) of geophysical data, such as seismic data, enable the inversion of subsurface seismic property models (e.g., velocity, density, and impedance) from field-recorded seismic data before stacking. The application of FWI to 4D seismic data (4D FWI) may lead to rigorous methods to directly solve for velocity and impedance changes in the subsurface with reduced seismic processing cycle time.

The FWI algorithm may include the following: using a starting subsurface physical properties model, synthetic seismic data are generated by solving a wave equation using a numerical scheme (e.g., finite-difference, finite-element, etc.). The synthetic seismic data are compared with the field-recorded seismic data. Using the difference between the two, the value of an objective function is calculated. To minimize the objective function, the starting model is perturbed to generate a modified subsurface model, which is used to simulate a new set of synthetic seismic data. This new set of synthetic seismic data is then compared with the field-recorded data to recalculate the value of the objective function. The objective function optimization procedure is iterated until an updated model is found to satisfactorily explain the observed data. A global or local optimization method may be used to minimize the objective function and to update the subsurface model. Local objective function optimization methods may include, but are not limited to, gradient search, conjugate gradients, quasi-Newton, Gauss-Newton and Newton's method. Global methods may include, but are not limited to, Monte Carlo or grid search.

From a mathematical perspective, a general formulation of FWI may be written as an optimization problem in which the following misfit function (G(m)) is minimized:

$$G(m)=\|W_d[d-F(m)]\|^2 \quad (1)$$

where d represents field seismic data, m denotes subsurface rock property model (e.g., velocity, impedance, etc.), F is the forward modeling operator, and $W_d$ is the data residual weighting operator.

In practice, this optimization problem is solved through iteration of model updates $m^k$ from the initial model $m^0$, in which the iterative form of the optimization process may be written as:

$$m^k=m^0+\Sigma_{j=0}^{k-1}\alpha_j f_j^{-1}(d-F(m^j)) \quad (2)$$

where $f_j^{-1}$ is the inversion operator that back-propagates the data residual as the perturbation to the model and $\alpha_j$ is the line-search parameter. When applied to 4D seismic, this formulation leads to the following model difference:

$$\Delta m^k=m_{monitor}-m_{base}=\Sigma_{i=1}^{N}\alpha_j f_j^{-1}(d_{monitor}-F(m^j)) \quad (3)$$

where $d_{monitor}$ denotes monitor seismic data and the iteration starts from the baseline FWI model $m^0=m_{base}$, where the baseline model used in Equation (3) is from the FWI run Inversion stops when the difference between consecutive model updates is smaller than a preset difference value, ε (e.g., the convergence criterion), as shown in the following equation:

$$|\Delta m^k-\Delta m^{k-1}|\leq \varepsilon \quad (4)$$

SUMMARY

In one implementation, a computer-implemented method for iteratively inverting geophysical data to generate a model difference (e.g., monitor model minus baseline model) corresponding to change(s) in the physical properties representative of a subsurface region is disclosed. The method includes: inverting, with at least one computer, the geophysical data in order to generate the model difference; determining using a transform of a first region of the model difference and a transform of a second region of the model difference, a convergence criterion, the first region and the second region not being coextensive; analyzing, with at least one computer, the convergence criterion; determining, with at least one computer and based on the analysis of the convergence criterion, whether to continue iterating the inversion for the model difference; in response to determining to continue iterating the inversion for the model difference, continuing, with at least one computer, iteratively performing inversion in order to generate updated model differences;

and in response to determining to stop iteration to invert for the model difference, stopping to iteratively invert for the model difference.

In another implementation, a non-transitory computer readable storage medium is disclosed. The non-transitory computer readable storage medium is encoded with instructions, which when executed, cause the computer to implement a method comprising of: inverting geophysical data in order to generate a model difference corresponding to changes in the physical properties representative of a subsurface region; determining using a transform of a first region of the model difference and a transform of a second region of the model difference, a convergence criterion, the first region and the second region not being coextensive; analyzing the convergence criterion; determining, based on the analysis of the convergence criterion, whether to continue iterating the inversion for the model difference; in response to determining to continue iterating the inversion for the model difference, continuing iteratively performing inversion in order to generate updated model differences; and in response to determining to stop iteration of the inversion for the model difference, stopping to iteratively invert for the model difference.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings.

DETAILED DESCRIPTION

Figure 1:
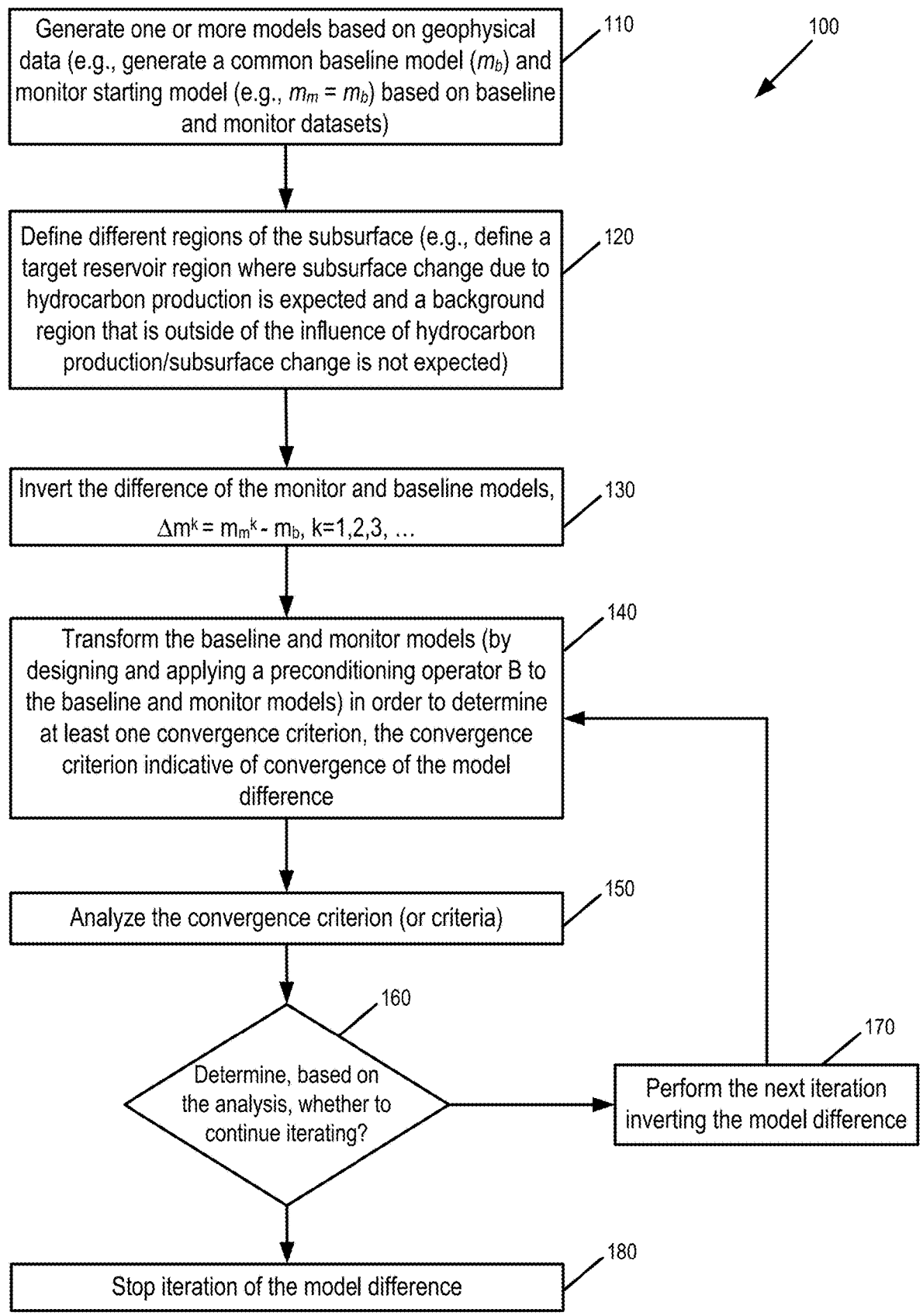
FIG. 1 illustrates an exemplary flow diagram of using one or more criteria for the different subsurface regions in order to determine whether to continue or stop iterating.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, convergence of the iterative process is determined by the preset difference value $\varepsilon$ between consecutive model updates (see equation (4) above). However, reliance on equation (4), which compares different iterations of the entire model with the preset difference value $\varepsilon$, may lead to model "underfit" (e.g., the FWI final model $m^k$ being too far removed from the true model) or model "overfit" (e.g., FWI converges to the true model in an earlier iteration, after which additional iterations result in FWI numerical noise). In particular, selecting $\varepsilon$ as an arbitrarily small number may lead to excessive FWI iterations, resulting in increasing computing cost and "overfitting" of the model. Selecting $\varepsilon$ as too large a number may lead to underestimating or "underfitting" the model.

More specifically, 4D FWI is directed to solving for the subsurface rock-property model difference between two seismic surveys acquired at different times (termed monitor and baseline) between which hydrocarbon is produced. For simplicity, one may consider only one monitor survey. Alternatively, multiple monitor surveys may be considered. However, the discussion herein is generalizable to multiple monitor surveys. The effect of "underfitting" or "overfitting" on 4D FWI results may be significant. "Underfitting" may lead to a model difference that under-predicts 4D changes while "overfitting" may lead to a model difference that includes high levels of background noise, obscuring the true 4D changes. In this regard, both "underfitting" and "overfitting" may cause difficulty in the interpretation of 4D FWI results.

Further, the iterative process is directed, as a general matter, to iteratively reducing the error in the model. However, previous applications of 4D FWI focused on errors in the overall model (see equation (4)) to determine whether the error in the model was reduced sufficiently in order to stop iterations, resulting in potential "overfitting" and "underfitting" errors.

In contrast, in one implementation, discussed further below, convergence may be determined based on analysis of the model difference of at least one subpart with another part. In a first specific implementation, the analysis is based on mutually exclusive subparts of the model, such as a first subpart directed to a target reservoir region and a second subpart directed to a background region in which no significant rock property changes are expected. In a second specific implementation, the analysis is based on at least one subpart (such as the subpart directed to target reservoir region) and another part with none of the target reservoir region of the model.

In one implementation, the analysis of transform of the model difference for the subpart with the transform of the model difference of the another part is used to generate a convergence criterion, with the convergence criterion being used to determine whether convergence of inversion (such as 4D FWI convergence) has occurred, and in turn whether further inversion of the model difference is warranted. The convergence criterion is indicative of inversion convergence (and in turn whether the model, such as the model of 4D FWI, is sufficient) based on the analysis of the subparts of the model, as discussed further below.

A subsurface may include different regions, such as a reservoir region (where subsurface changes occur due to hydrocarbon production) and a background region (outside of the reservoir region), with the different regions having a predetermined relation. In one implementation, the model differences between monitor and baseline for the different regions of the subsurface are selected. These model differences for different regions may likewise behave in a predetermined manner with one another when the model difference has sufficiently converged. In this regard, the criterion generated from the model difference for the different regions of the subsurface, may be used as an indicator of convergence.

As discussed above, various regions, such as a first region and a second region, are contemplated (e.g., the first region comprises a target reservoir region and the second region comprises a background region). In one implementation, the system may define the various regions based on one or more data inputs, with the system then using the model difference for those defined regions in order to generate the convergence criterion. For example, the system may define one or more target reservoir regions where hydrocarbon may be produced or is present and where 4D signals related to fluid saturation and pressure changes are expected. As another example, the system may define one or more region(s) where secondary production effects occur, such as strain in the overburden due to reservoir compaction. As yet another example, the system may define one or more background regions, which may comprise the remaining regions of the survey where there may be no hydrocarbon production and where no 4D signal is expected. Thus, in one implementation, the definition of one of the target reservoir or background regions may be dependent on previously defined target reservoir or background regions. For example, the target reservoir region may be defined first, and the background region may be defined as being outside of the target reservoir region. Alternatively, the definition of the different regions, including the target reservoir region and the background region, may be independent on one another. In this way, the defined regions are not coextensive (and may be mutually exclusive).

In one implementation, in order to define the one or more of the regions, the system may use data from any one, any combination, or all of the following: exploration data; development data; or production data. Exploration data are associated with the search for oil and gas reservoirs by geologists using, for example, seismic surveys and exploration well-log data. Development data are related to the development of the site, and include additional seismic and well-log data. These data are acquired and processed before and during drilling wells in preparation of oil and gas production. Production data include volumes and rates of produced crude oil and natural gas and pressure measurements, 4D seismic data to monitor subsurface changes related to oil and gas production.

As one example, seismic data such as baseline seismic data and monitor seismic data may be used to define the target reservoir region. As discussed further below, the baseline seismic image of the subsurface may be generated by migrating the baseline seismic data using a tomographic velocity model or the baseline FWI model; the monitor seismic image of the subsurface may be generated by migrating the monitor seismic data using the same velocity model for migrating the baseline data. The baseline seismic image and the monitor seismic image may be analyzed in combination in order to delineate or define the target reservoir region. Due to potential noise in the data, the defined target reservoir region may not be precisely limited to the actual reservoir region in the subsurface. In this regard, the defined target reservoir region may be less than or more than the entire actual reservoir region.

As discussed above, the subparts or subregions of the model difference (e.g., the difference between the monitor model and the baseline model, such as $m_{monitor} - m_{baseline}$) may behave differently from one another, such as due to the presence of or lack of hydrocarbon production. In this regard, transformations of the subparts or subregions of the model difference (including, but not limited to, using the model to migrate the seismic data and/or calculating amplitude differences and time shifts between baseline and monitor seismic data) and analysis (e.g., comparison) of the transforms of the subparts or subregions of the model difference may indicate convergence of inversion. In particular, transforming the model may generate one or more criteria, with analysis of the one or more criteria determining convergence. For example, comparing changes in the transformations of the model difference for the different regions from different iterations (such as successive iterations) may indicate whether or not the 4D FWI converges. Alternatively, or in addition, analysis of the transformations of the model differences in different regions within a single iteration may likewise indicate convergence.

The transformations (and the resulting generated convergence criterion or criteria) may be selected to highlight the different behaviors of the model difference in different subregions when iterating. Specifically, when iterating a model difference, various parts or regions of the model difference may change differently than others. For example, the target reservoir region(s) of the model difference ($m_{monitor} - m_{baseline}$), which can be expected to have subsurface changes due to hydrocarbon production, may change at different rate(s) during iteration than the background region(s) of the model difference. In this way, the criterion, which may be generated based on comparing the transform of the target reservoir region and the background region, may be analyzed in different iterations (such as successive iterations) to determine convergence of iteration of the model difference.

In this regard, one or more criteria, generated by transforming subparts of the model difference, may be used in order to indicate convergence. For example, the transform for the background region may stabilize (or change more slowly) after fewer iterations than does the transform for the target reservoir region. The system may thus analyze the convergence criterion based on the transforms of the target reservoir region and the background reservoir region, generated for different iterations of the model difference, in order to determine whether the subparts of the model difference have stabilized, thereby indicating convergence of 4D FWI. Further, separate from the change in a convergence criterion or criteria between iterations as being indicative of convergence, comparison of the transform of the model difference for a specific iteration may likewise indicate convergence. For example, a ratio of the transform for the target reservoir region and the transform for the background region may be compared to a predetermined value to indicate whether 4D FWI is converging.

Thus, in one implementation, subparts of the model difference of 4D FWI are transformed in order to generate a single convergence criterion or multiple convergence criteria. Analysis of the convergence criterion (or criteria) generated based on the different subparts of the model difference may indicate convergence of iteration of the model difference.

The convergence criterion selected may exhibit a predetermined relationship when the model difference of 4D FWI has sufficiently converged. As one example, the predetermined relationship may be compared from one iteration to another iteration. In particular, the criterion in a current iteration may be compared with the criterion in a previous iteration to determine whether there is convergence. Specifically, the current iteration criterion (which may be termed a current iteration indicator) may comprise a ratio of the transformation of the target reservoir region in the current iteration of the model difference with the transformation of the background region in the current iteration of the model difference. Likewise, the previous iteration criterion (which may be termed a previous iteration indicator) may comprise a ratio of the transformation of the target reservoir region in the previous iteration of the model difference with the transformation of the background region in the previous iteration of the model difference. The change of the ratios between the iterations may then be used to determine whether to continue or to stop iterating (e.g., the indication of change of the ratios may be compared with a predetermined value; if the indication of change is less than the predetermined value, iterating ends; if the indication of change is equal to or more than the predetermined value, iterating continues).

As another example, the comparison (such as the ratio used to generate the criterion) of the transforms of the target reservoir region and the background region for the current iteration may be compared with a predetermined number to determine whether the comparison is indicative of 4D FWI convergence (e.g., the ratio is within a predetermined amount of the predetermined number). As still another example, the ratio of transforms for iteration k may be compared with the ratio of transforms for iteration k−1 and may be compared with a predetermined number to determine convergence. In this regard, the convergence criterion (or criteria) may be analyzed in order to determine whether to continue iterating or whether to stop iterating.

Various criteria indicative of convergence are contemplated. In one implementation, the convergence criterion may be based on a transform of at least one model difference, such as based on a transform of difference of the monitor model (e.g., the monitor FWI model) with the baseline model (e.g., the baseline FWI model). As discussed in the background, seismic surveys may be acquired at different times, which may be termed baseline seismic data (or baseline data) and monitor seismic data (or monitor data). The baseline data may be migrated using the baseline FWI model, and the monitor data may be migrated using the monitor FWI model (e.g., for each FWI iteration run).

In one example, the convergence criterion may be based on the difference between the baseline model and the monitor model for the respective regions. In particular, one example convergence criterion may be based on the root-mean-square (RMS) values of the model difference between the monitor model and the baseline model in the target reservoir region and in the background region. Specifically, the ratio of the RMS values for the target reservoir region and the background region may approach a predetermined value (e.g., 1) as being indicative of sufficient convergence (e.g., the monitor FWI model is sufficiently error free so as to stop iterating). For example, at the initial FWI iteration run on the monitor data, the ratio of the RMS values may have a large value. As the FWI iterations progress, the ratio may approach a predetermined value (such as approaching 1 or approaching a steady state), which may indicate that the target reservoir difference obtained from 4D FWI approaches the background difference. Convergence may thus be determined based on this ratio reaching the predetermined value within a small tolerance between iterations (such as between successive iterations) and/or approaching (within the same or different tolerance) a predetermined value for a specific iteration.

In another implementation, the convergence criterion may be based on comparing actual data with simulated data generated from the model difference in the different regions of interest. For example, input shot gathers (e.g., actual data) and co-located FWI-simulated shot gathers (e.g., generated from the monitor model) may be cross correlated. Time shifts between the corresponding shot gathers may be calculated so that maximum cross-correlation coefficients are determined, with the maximum cross-correlation coefficients and time shifts of the target reservoir region and background region being tracked for different FWI iterations (such as successive iterations). This methodology may identify convergence based on comparing the actual data with the simulated data. For example, analyzing the comparison of the actual data with the simulated data may indicate convergence when there is no significant change in the time shifts and/or cross-correlation coefficients for the target reservoir region and background region (e.g., the changes between iterations are within a predetermined amount).

In one implementation, the convergence criterion may be based on comparing images (such as migrated images) from respective models for the different regions to determine an indication of alignment of the images obtained from the respective models for the different regions. Specifically, the convergence criterion may be based on comparing the migrated monitor image (as generated by the monitor model) with the migrated baseline image (as generated by the baseline model) for the target reservoir region and for the background region. As one example, the migrated images for the models may comprise prestack depth migrations, with the methodology for analyzing the images in the target reservoir region and background region for the respective models being at least one aspect of alignment (e.g., comparing the depth or time shifts between the consecutive 4D FWI iterations inside the target reservoir region and outside the reservoir region). Other migrated images are contemplated.

Thus, the methodology performs a transform of the model difference for the respective regions (e.g., the target reservoir region and the background region), and compares the result of the transforms with one another. In one implementation, the result of the transforms may be directly compared to one another. For example, RMS values of the model difference between monitor and baseline in the target reservoir region and the background region are directly compared with one another. In another implementation, the result of the transforms may be indirectly compared to one another. For example, the input shot gathers for the target reservoir region may be compared with the FWI simulated shot gathers (from the FWI model) for the target reservoir region, with the comparison resulting in an input shot gather target reservoir region comparison, and the input shot gathers for the background region may be compared with the FWI simulated shot gathers for the background region, with the comparison resulting in an input shot gather background region comparison. The input shot gather target reservoir region comparison may then be compared with the input shot gather background region comparison, so that the results of the transforms are indirectly compared with one another.

Further, as discussed above, the methodology may analyze the convergence criterion (or criteria) in order to determine whether to continue iterating or to stop iterating. In one implementation, the methodology analyzes a single convergence criterion to determine whether to continue iterating or to stop iterating. Alternatively, the methodology analyzes multiple convergence criteria, such as at least two criteria, at least three criteria, or more in order to determine whether to continue iterating or to stop iterating. As discussed above, the analysis of the convergence criterion or criteria may comprise examining the convergence criterion/criteria for different iterations of the FWI model difference (such as consecutive iterations). Alternatively, or in addition, the analysis of the convergence criterion or criteria may comprise examining the convergence criterion/criteria for a single iteration of the FWI model difference.

Referring to the figures, FIG. 1 illustrates an exemplary flow diagram 100 of using one or more convergence criteria for the different subsurface regions in order to determine whether to continue or stop iterating. At 110, one or more models are generated based on geophysical data, such as seismic data. As one example, a common baseline model ($m_b$) and a monitor starting model ($m_m$) may be generated based on baseline and monitor datasets. The simplest case is where $m_m = m_b$.

Thus, in one implementation, two sets of measurements (or datasets) are generated and may be stored in a memory for later access. The two sets of measurements are obtained at different times, including one dataset obtained before a change in the subsurface ("baseline dataset", $d_b$) and one after changes have taken place ("monitor dataset", $d_m$). The baseline dataset may be obtained before or after any change in the subsurface properties. In this regard, the change bracketed by the baseline dataset and the monitor dataset may be a sample of the subsurface change between two different time stamps. Further, it is assumed that $m_b$ and $m_m$ denote (generally unknown) parameter sets (seismic or otherwise) corresponding to the above baseline dataset and monitor datasets which will be referred to as the "baseline" model ($m_b$) and "monitor" model ($m_m$).

Further, though the discussion below is directed to geophysical datasets (e.g., seismic datasets) and subsurface property models, the methodology may be used in other applications when there exists a mathematical procedure for predicting measurements given a model (e.g., $d=F(m)$, referred to herein as "forward modeling"), and an iterative mathematical inversion procedure for estimating the model m given a set (vector) of measurements (e.g., $m^k = \tilde{F}^{-1}(d, m^{k-1})$, $\lim_{k \to \infty} m^k \approx m$). Time-lapse inversion in this context comprises estimating the model difference $\Delta m = m_m - m_b$, where the baseline model ($m_b$) and monitor model ($m_m$) are inverted from the baseline dataset ($d_b$) and monitor dataset ($d_m$) either separately (e.g., as in parallel FWI or sequential FWI) or jointly (as in simultaneous FWI). In this regard, any discussion regarding inversion of datasets to generate the subsurface property models may likewise be applied to other iterative mathematical inversion procedures for estimating the model given a set of measurements.

When generating the subsurface property model, "time-lapse inversion" comprises any numerical procedure (such as based on iteratively solving a mathematical optimization problem) for extracting changes of subsurface parameters (e.g., parameters including, without limitation, elastic moduli, impedances, subsurface velocities, fluid pressures and subsurface stress tensors, fluid saturations, rock density, reflectivity, and conductivity) as well as acquisition parameters (e.g., seismic or electromagnetic source parameters and locations). In a specific implementation, the methodology is directed to computationally intensive seismic inversion applications such as all implementations of time-lapse full-waveform inversion. More generally, the methodology may be applied to any time-lapse inversion that involves iterative improvement or estimation of unknown values.

At 120, different regions of the subsurface are defined. For example, a target reservoir region may be defined as an interval where subsurface change due to hydrocarbon production is expected. Likewise, another region that is not coextensive with (and may be mutually exclusive to) the target reservoir region may be defined, such as a background region that is outside of the influence of hydrocarbon production and where subsurface change is not expected. The definition of the regions may be performed once, either prior to or after obtaining the datasets. Alternatively, the definition of the regions may be performed multiple times, such as either prior to or after obtaining the datasets.

For example, any one, any combination, or all of exploration data, development data, or production data may be used to define the target reservoir region(s). Various types of definitions are contemplated. For example, one type of definition may comprise a 3-D spatial definition in which the target reservoir region and the background region are defined in the x-, y-, and z-axes (e.g., the entire subsurface region in the x-direction might be from 0 to 3 km with the target reservoir region being defined as between 1.5 km and 2.5 km).

At 130, the difference of the multiple models, such as the monitor and baseline models are inverted (e.g., $\Delta m^k = m_m^k - m_b$, k=1, 2, 3, ...). At 140, the baseline and monitor models are transformed, such as by designing and applying a preconditioning operator B to the baseline and monitor models, in order to determine at least one convergence criterion, with the convergence criterion indicative of convergence of the model difference. For example, the transformation (e.g., RMS ratio, the simulated data, the prestack depth migrations, discussed further below) of the model difference may be performed in order to determine at least one convergence criterion for the different defined regions of the subsurface. In one implementation, the convergence criterion, based on the transformations of the different defined regions, is indicative of convergence of the model difference. In one implementation, a transformation is performed, with the transformations of the different defined regions being generated based on the transformation of the entire model difference. For example, based on the 3-D space definition of the target reservoir region and the background region, the transforms associated with the target reservoir region and the background region may be identified within the transform of the entire model difference. As discussed above and further below with regard to FIGS. 6-9B, various convergence criteria may be used to indicate convergence of the model difference. Thus, instead of simply examining the entirety of the model difference for convergence, at least one convergence criterion is based, at least in part, on analysis of a subregion of the model difference compared with at least one other region (whether a subregion or the entirety) of the model difference.

At 150, the criterion (or criteria) are analyzed. One type of analysis of the criterion (or criteria) comprises comparing. As discussed above, various types of comparisons are contemplated, including direct and indirect comparisons, ratios, or the like. At 160, it is determined, based on the analysis in 140, whether to continue iterating. For example, it may be determined whether 4D FWI convergence has occurred. If so, at 180, iteration of the model difference is stopped (e.g., with the last iteration of the model difference, such as the model of 4D FWI results, being designated as final). If not, at 170, the next iteration (such as further inversion) for the model difference is performed. For example, further iteration may generate any one, any combination, or all of: an updated baseline model, an updated monitor model, or updated model difference. In particular, in one or some embodiments, iteration generates the updated model difference. Alternatively, iteration generates both an updated baseline model and an updated monitor model in order to generate the updated model difference. Thus, the convergence criterion (or criteria) may be selected such that, when analyzed, indicate(s) that the iterations of a specific time-lapse inversion algorithm have reached the limits of practical time-lapse resolution, and that subsequent iterations will not result in a further enhancement of the inverted time-lapse 4D FWI signal.

The final model may then be used in one of several contexts, such as to generate an output based on the model (e.g., generating an image for display), to manage hydrocarbon production, or to monitor other environmental activities including carbon capture and storage operations, geothermal applications, and underground hydrological prospecting and extraction. Hydrocarbon management may include any one, any combination or all of hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. For example, prospecting may include causing a well to be drilled that targets a hydrocarbon deposit derived from the subsurface image.

Figure 2:
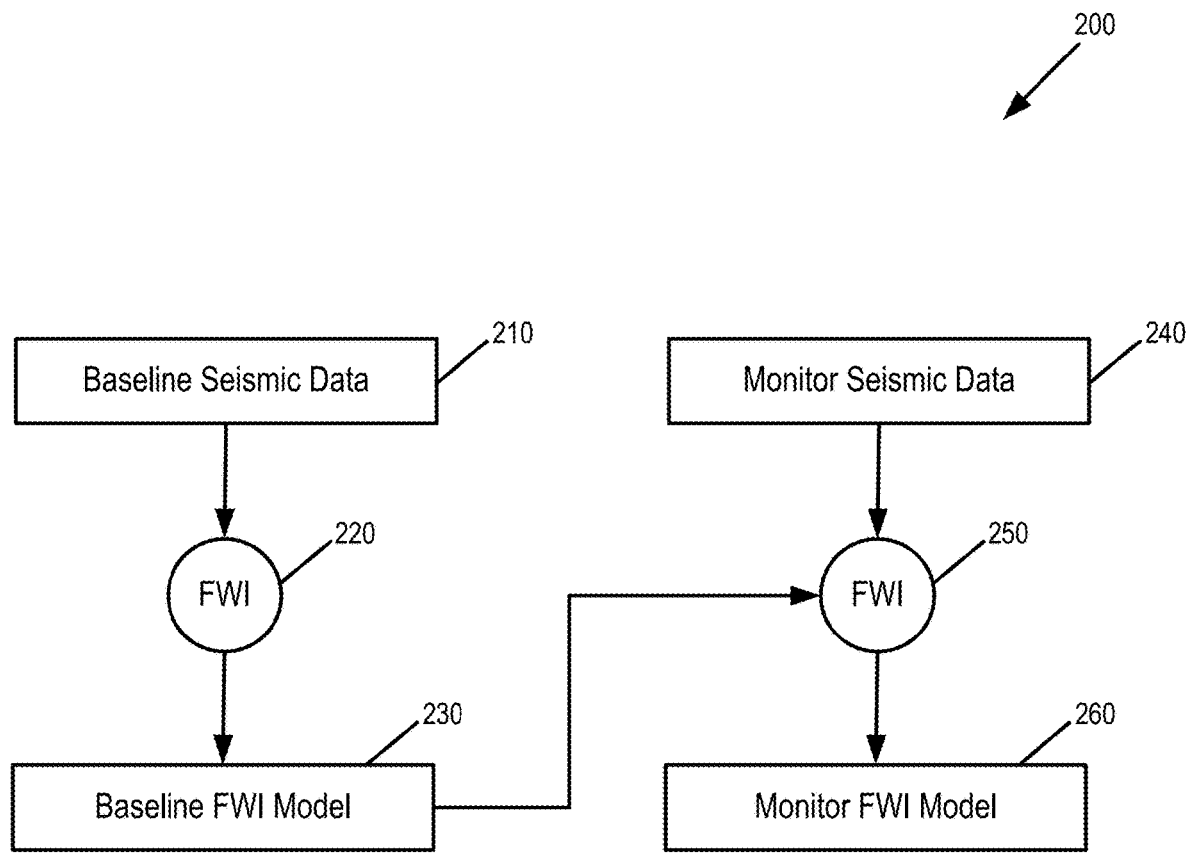
FIG. 2 illustrates a sequential difference 4D FWI workflow.

Further, various types of inversion (such as 4D FWI) are contemplated. For example, sequential difference FWI may be used to generate the model difference, such as illustrated in diagram 200 of FIG. 2, and further illustrated in FIGS. 7-9B. Though FIG. 2 illustrates sequential difference FWI, other 4D FWI workflows are contemplated, such as but not limited to, parallel 4D FWI workflow, simultaneous 4D FWI workflow, etc. In sequential difference FWI, a baseline FWI model 230 is first inverted 220 from the baseline seismic data 210. The baseline FWI model 230 is then used as the initial model for monitor data FWI, so that monitor FWI model 260 is inverted 250 using the baseline FWI model 230 and the monitor seismic data 240.

In this regard, separate from sequential difference FWI, other 4D FWI workflows are contemplated, such as simultaneous FWI. Inversion examples are illustrated in US Patent Application Publication No. 2015/0012221, US Patent Application Publication No. 2018/0156932, U.S. Pat. Nos. 8,437,998, and 8,537,638, each of which are incorporated by reference herein in their entirety.

As discussed above, one or more convergence criteria, indicative of convergence, may be generated using a transform of a subpart or subregion of the model difference. The following lists three possible convergence criteria: (1) the RMS ratio of the model difference between monitor and baseline in the target reservoir region(s) and the background; (2) maximum values of cross-correlation coefficients and time shifts between input field gathers and FWI simulated gathers in the target reservoir region(s) and the background; and (3) depth shifts between stacks of monitor and baseline seismic data migrated with the corresponding FWI monitor and baseline models in the target reservoir region(s) and the background. The convergence criteria listed are for illustration purposes. Other convergence criteria indicative of convergence are contemplated. Further, only one of convergence criterion (1), (2), or (3) may be used to determine convergence. Alternatively, multiple combinations of convergence criterion (1), (2), or (3) (such as pairs or all three of convergence criterion (1), (2), or (3)) may be used to determine convergence.

Figure 3:
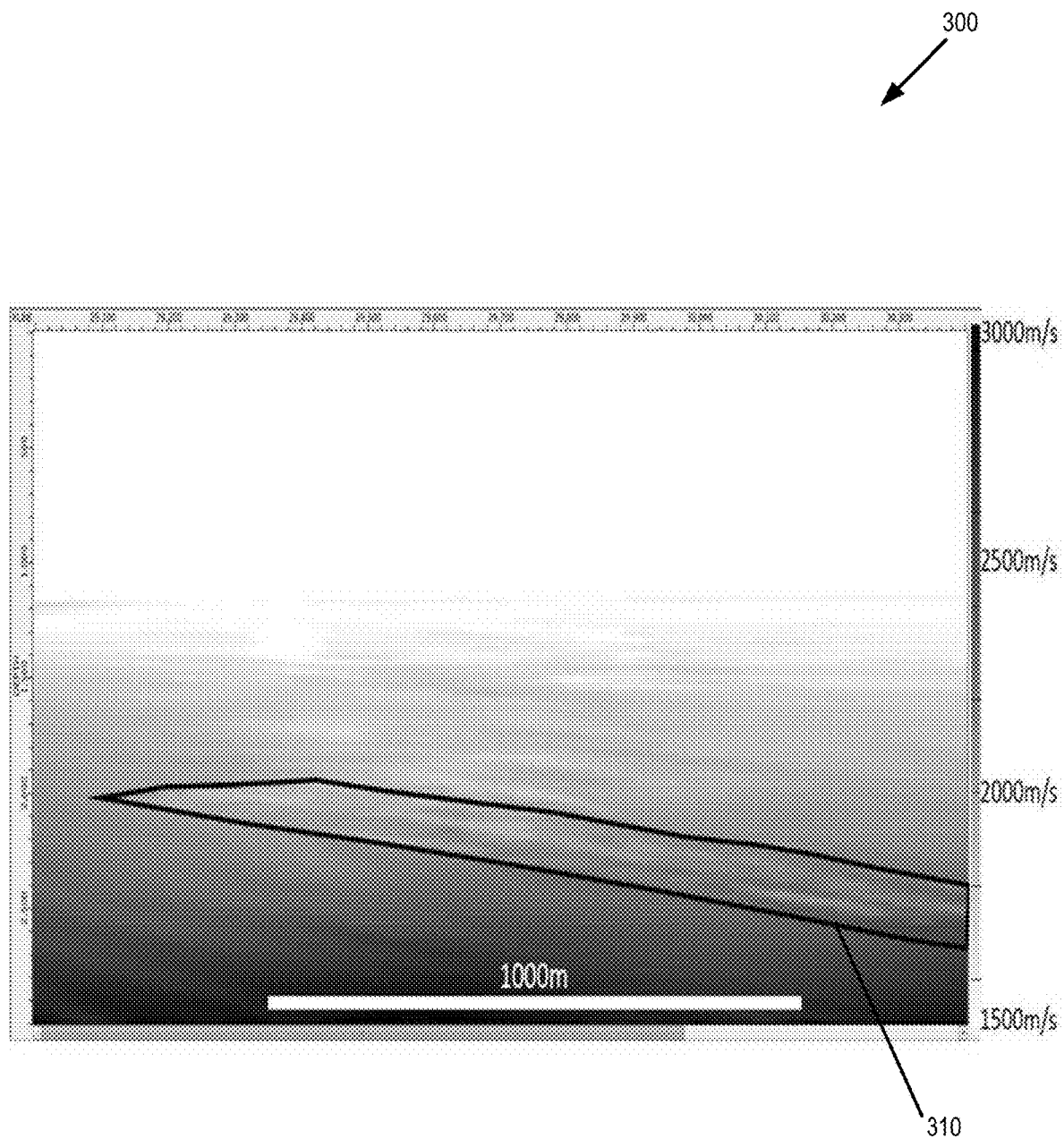
FIG. 3 illustrates a P-wave velocity model constructed from a geology model and reservoir properties of a deepwater oil field.
Figure 4:
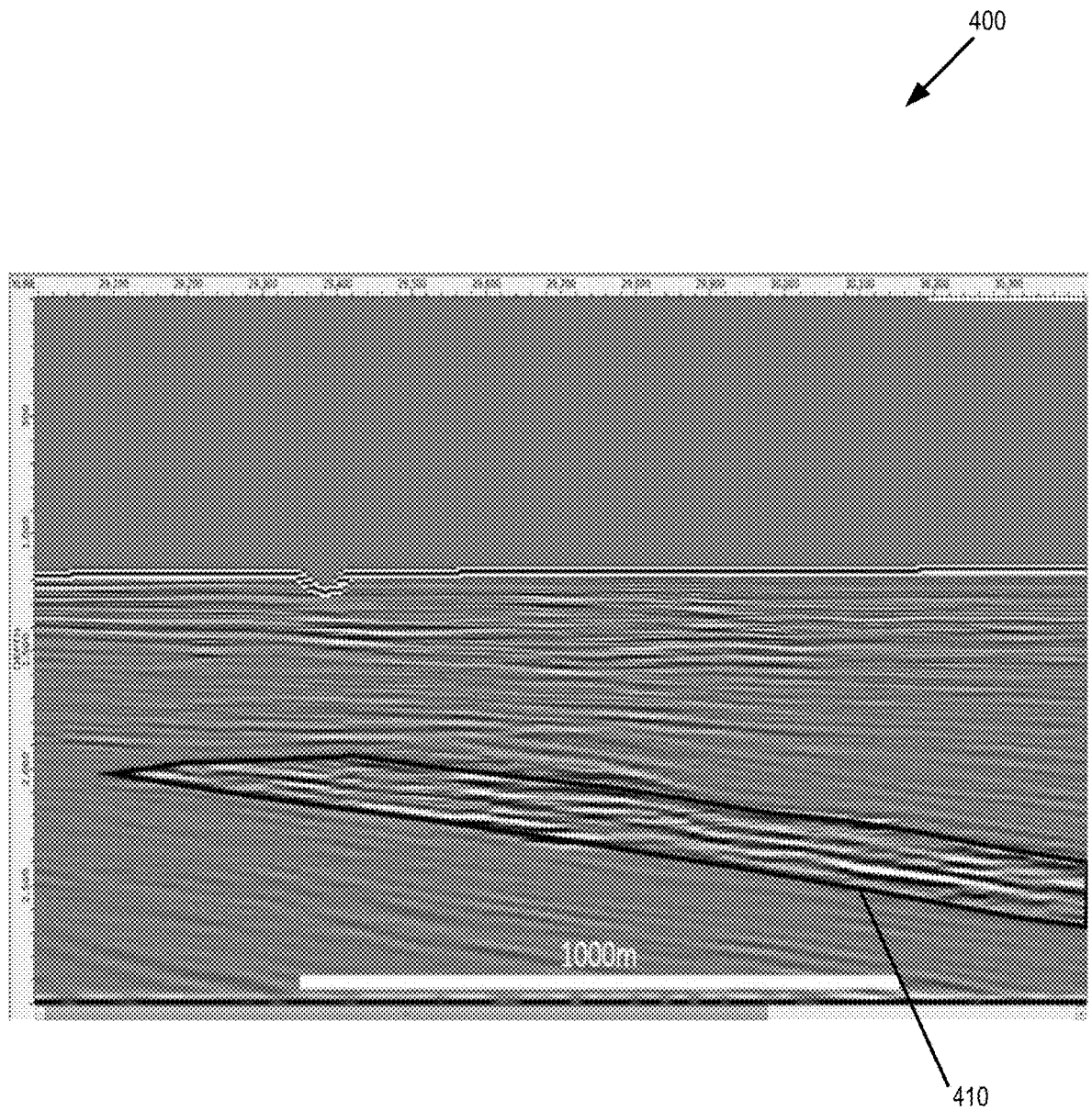
FIG. 4 illustrates a seismic image corresponding to the P-wave velocity model of FIG. 3.
Figure 5A:
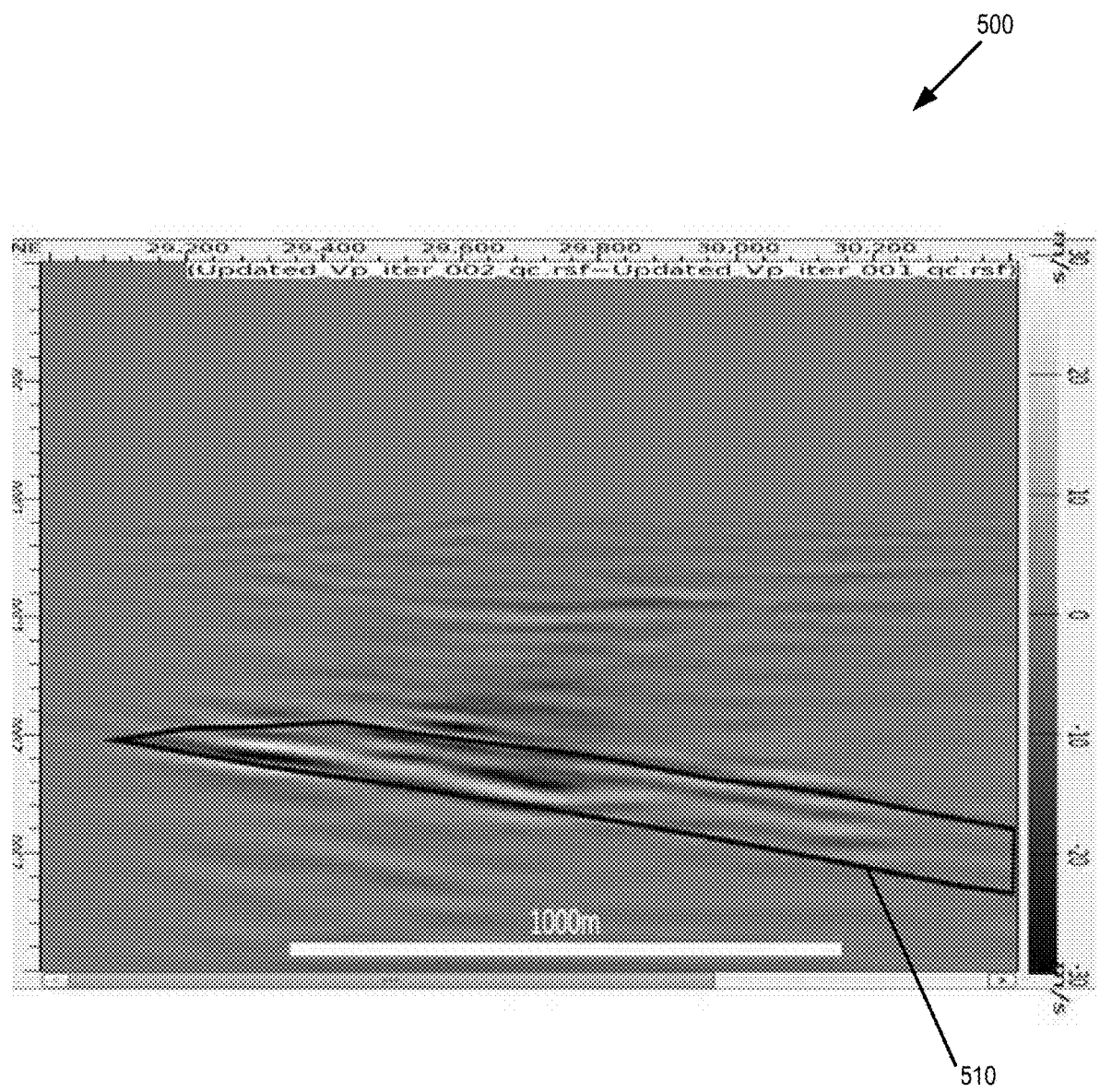
FIGS. 5A-C illustrates the model difference between consecutive 4D FWI iterations $\Delta m^k - \Delta m^{k-1}$, FIG. 5A illustrating $\Delta m^3 - \Delta m^2$, FIG. 5B illustrating $\Delta m^{11} - \Delta m^{10}$, and FIG. 5C illustrating $\Delta m^{20} - \Delta m^{19}$, where $\Delta m^i = (m_{monitor} - m_{base})^i$ denotes the 4D model difference after $i^{th}$ 4D FWI iteration.
Figure 5B:
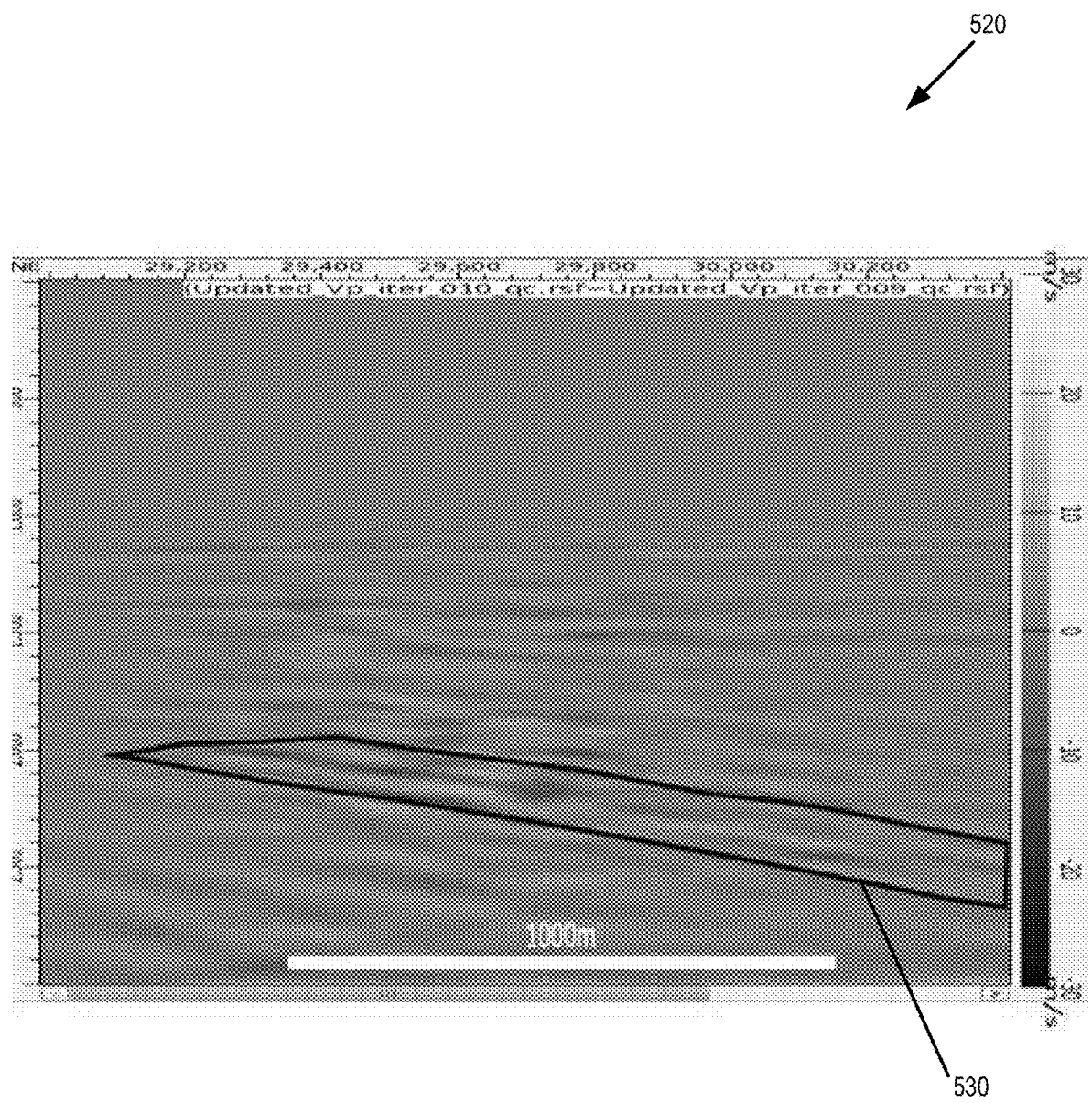
Figure 5C:
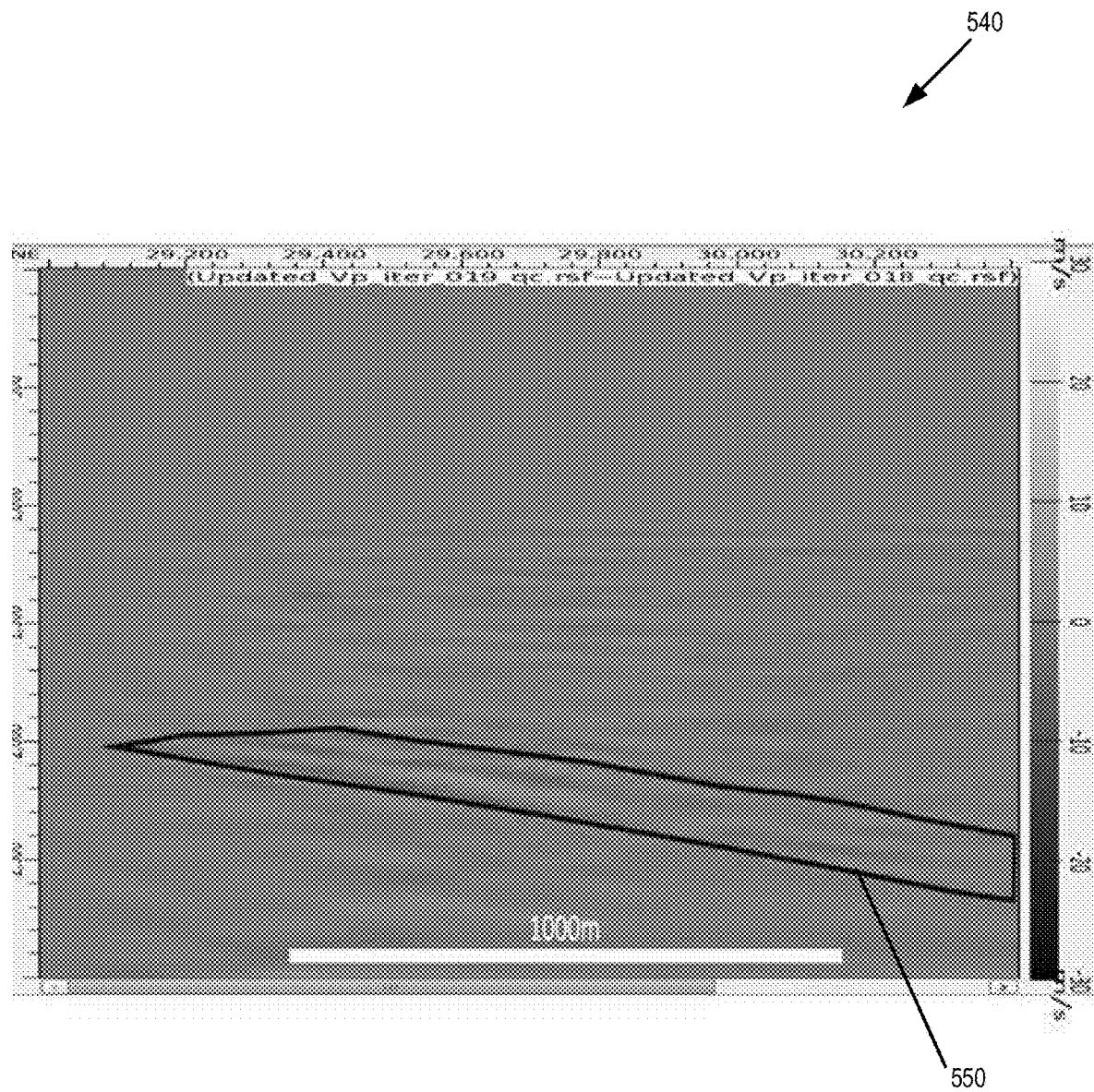

FIGS. 3-5C are examples of an application of the methodology to 4D FWI of time lapse seismic, such as in the context of using criteria (1) to indicate convergence. In particular, FIG. 3 illustrates a baseline image 300 of a P-wave velocity model constructed from a geology model and reservoir properties of a deepwater oil field. The S-wave velocity model and density model were generated from rock physics modeling. FIG. 4 illustrates the baseline image 400 of the seismic data simulated from the P-wave velocity, S-wave velocity, and density models. A monitor seismic dataset was generated from similar processes. The black polygon 310, 410, 510, 530, 550 illustrated in FIGS. 3-5C defines the target reservoir region where hydrocarbon production induced changes are expected. FIGS. 5A, 5B, and 5C illustrate images 500, 520, 540 of the change in the 4D FWI inverted model difference calculated between different iterations ($\Delta m^k - \Delta m^{k-1}$) using sequential inversion, including FIG. 5A illustrating $\Delta m^3 - \Delta m^2$ (between iteration 3 and 2), FIG. 5B illustrating $\Delta m^{11} - \Delta m^{10}$ (between iteration 11 and 10), and FIG. 5C illustrating $\Delta m^{20} - \Delta m^{19}$ (between iteration 20 and 19), where $\Delta m^i = (m_{monitor} - m_{base})^i$ denotes the 4D model difference after $i^{th}$ 4D FWI iteration. After the initial inversion runs (such as illustrated in FIG. 5A), the change in the inverted model difference calculated between two consecutive iterations ($\Delta m^3 - \Delta m^2$) inside the target reservoir region is much greater than that outside the target reservoir region. As inversion progresses, this difference $\Delta m^k - \Delta m^{k-1}$ inside the target reservoir region and outside the target reservoir region becomes smaller (see FIG. 5B vs. FIG. 5A). After 20 iterations, the difference ($\Delta m^{20} - \Delta m^{19}$) inside the target reservoir region and outside the target reservoir region becomes similar. In this regard, tracking the difference between the convergence criterion (or criteria) for the subregions during iterations may indicate convergence. In one implementation, the tracking of convergence may be performed at each iteration. Alternatively, the tracking may be performed after multiple iterations (e.g., such as after each $5^{th}$ iteration).

Figure 6:
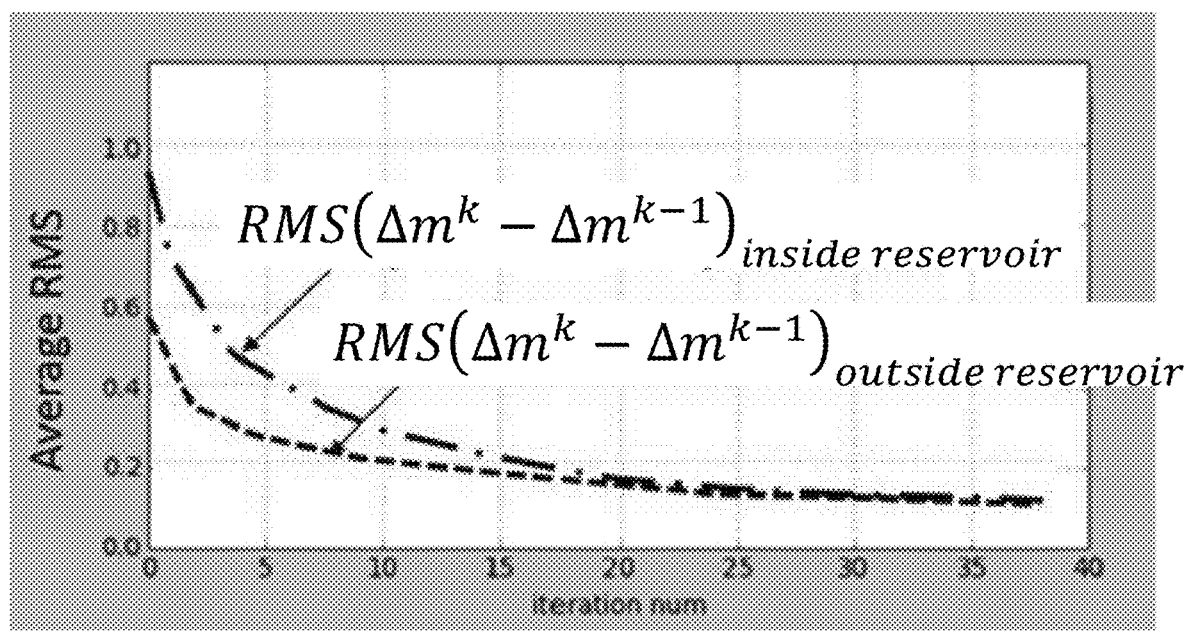
FIG. 6 illustrates a graph of one type of the transforms to the 4D FWI iteration results: the root-mean-square (RMS) of 4D model difference from consecutive 4D FWI iterations inside and outside the target reservoir regions.

Thus, one example convergence criterion is the RMS of the change between two consecutive iterations of the inversion for the model difference ($\Delta m^k - \Delta m^{k-1}$) for different iterations, k, inside the target reservoir region and outside of the target reservoir region. Specifically, comparing the RMS for the different regions (inside and outside of the target reservoir region) for different iterations may indicate convergence. This is illustrated in FIG. 6, which is a graph 600 of simulated data for the root-mean-square (RMS) of the change in the 4D model difference calculated between consecutive 4D FWI iterations inside the target reservoir region and outside the target reservoir region. As discussed above and shown in FIG. 6, the average RMS in the initial iterations is markedly different inside and outside the target reservoir region. The separate curves indicate several things. First, the curve for RMS outside the target reservoir region stabilizes quicker (at fewer iterations) than the curve for RMS inside the target reservoir region. Second, the curves for RMS inside and outside the target reservoir region eventually converge (e.g., are eventually in a 1:1 relation to one another, indicating the target reservoir region difference inverted from 4D FWI runs approaches the background region difference). In other implementations, such as when factoring in noise, the curves for RMS inside and outside the target reservoir region might eventually converge to a relationship other than 1:1 (such as 8:1). In this way, FIG. 6 shows a representation of this convergence criterion in which RMS of the change in the model difference calculated between consecutive iterations RMS ($\Delta m^k - \Delta m^{k-1}$) may be used to quantify the convergence process.

From a computational standpoint, since the curve for RMS outside the target reservoir region stabilizes quicker, in one implementation, the RMS outside the target reservoir need not be calculated for each iteration. Rather, once the value for RMS outside the target reservoir stabilizes (e.g., the change of the RMS outside the target reservoir in successive iterations is less than a certain amount), the methodology need not recalculate the RMS outside the target reservoir at every iteration and may use the value for the RMS outside the target reservoir from a previous iteration. Alternatively, both the RMS inside and outside the target reservoir may be calculated for each iteration.

Thus, convergence may be indicated in one of several ways. In one implementation, convergence may be determined based on a ratio of the RMS values inside and outside the target reservoir region (e.g., a ratio that is within a predetermined tolerance about a value of 1 indicates convergence). Alternatively, or in addition, convergence may be determined based on the change in the ratios of the RMS values inside and outside the target reservoir region from one iteration to the next (e.g., a change in ratios being less than a predetermined amount indicates convergence).

The data illustrated in FIG. 6 is simulated. Due to noise, actual data may deviate in its response. To compensate for the noise, the methodology may initially filter the data. Alternatively, or in addition, the methodology may compare the ratio of the RMS values inside and outside the target reservoir region to a different number or may determine whether the ratio has stabilized. As discussed above, the ratio of the RMS values inside and outside the target reservoir region is compared to 1. For actual data, the ratio of the RMS values inside and outside the target reservoir region may be compared to a different number, such as a value less than 1.

Figure 7:
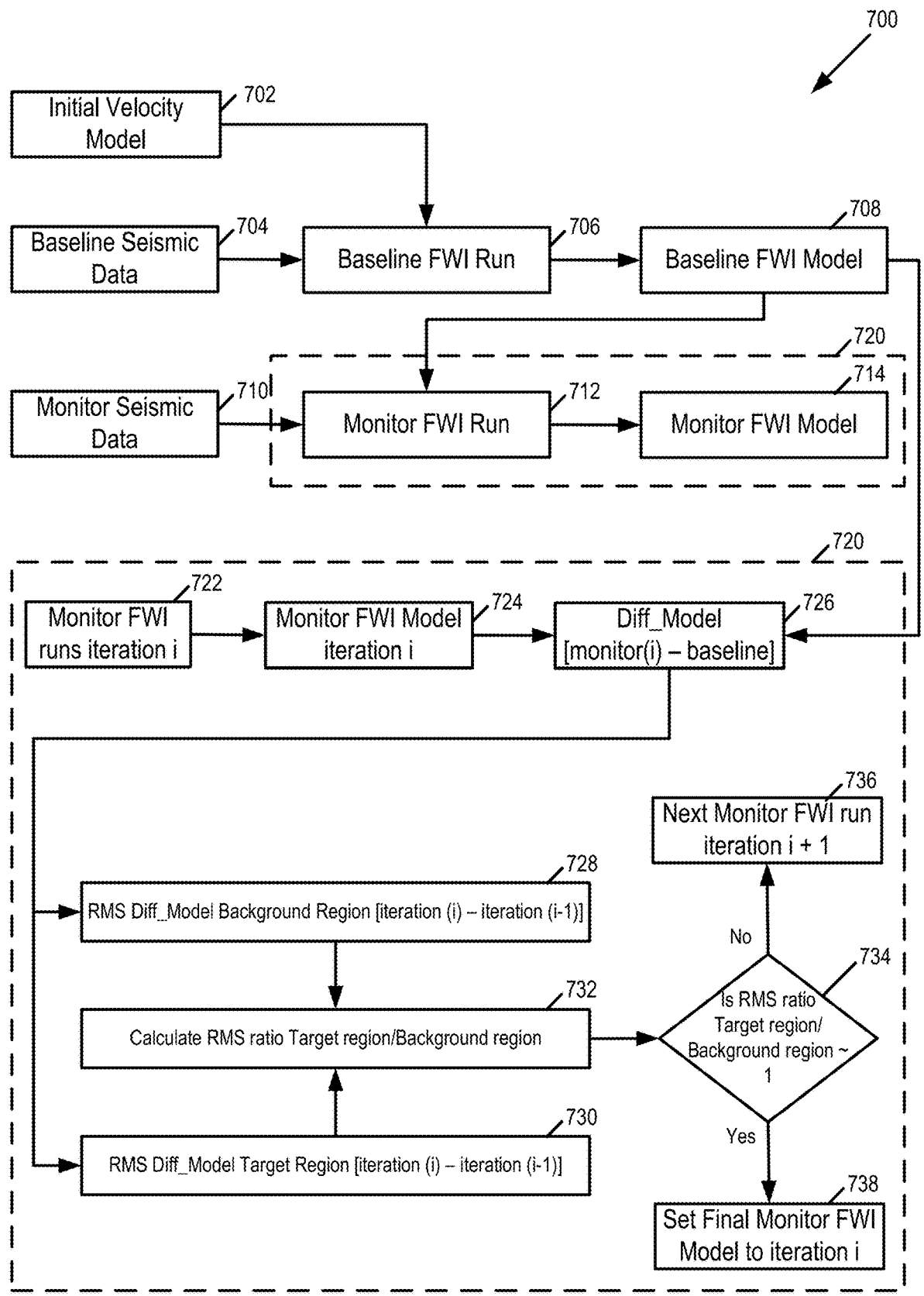
FIG. 7 illustrates a flow diagram for determining convergence based on the RMS ratio of the model difference between monitor and baseline inside the target reservoir region(s) and outside in the background region(s).

FIG. 7 illustrates a flow diagram 700 for determining convergence based on the RMS ratio of the model difference between monitor and baseline in the target reservoir region(s) and the background region(s). The upper part of the figure, including blocks 702, 704, 706, 708, 710, 712, and 714 show a sequential difference 4D FWI workflow, such as illustrated in FIG. 2. The lower part of the figure is an expansion of block 720, which includes the determination of convergence.

An initial velocity model 702 and the baseline seismic data 704 may be used by the baseline FWI run 706, which in turn may generate the baseline FWI model 708. Further, for the sequential difference 4D FWI workflow, the baseline FWI model 708 and the monitor seismic data 710 are used by the monitor FWI run 712, which in turn may generate the monitor FWI model 714.

Expanding block 720, monitor FWI runs iteration i (at 722), which results in the monitor FWI model for iteration i (at 724). At 726, a differential model is generated between the monitor FWI model (iteration i) and the baseline FWI model (input from 708). This differential model is then used to determine at 728 the RMS for the background region between iteration (i) and iteration (i−1), and at 730 the RMS for the target reservoir region between iteration (i) and iteration (i−1). Thus, RMS values of the differential model at block 726 between monitor and baseline (diff) in the target reservoir region and the background region are calculated for consecutive FWI iterations:

$$RMS_{target}{}^i = RMS_{diff} \text{ (target reservoir region, iteration } i)$$

$$RMS_{background}{}^i = RMS_{diff} \text{ (background region, iteration } i)$$

As discussed above, the background region may stabilize quicker. In this regard, tolerance may also be set separately for background $RMS_{diff}$, after which additional FWI iterations are restricted to the target reservoir region by masking the input data and gradient of the background.

At 732, the RMS ratio for the target reservoir region versus the background region is calculated. In particular, the RMS ratio=RMS Diff_Model Target Region [iteration (i)−iteration (i−1)]/RMS Diff_Model Background Region [iteration (i)−iteration (i−1)].

At 734, the RMS ratio is compared to a predetermined target value, such as 1. If the RMS ratio is within a predetermined tolerance of the target value, it is determined that convergence has occurred (a "yes" determination from block 734), so that at 738, iteration ends and the final monitor FWI model is set to iteration i. If not, it is determined that convergence has not occurred (a "no" determination from block 734), so that at 736, iteration continues by generating an updated model and the next monitor FWI run of iteration i+1 is performed.

Figure 8:
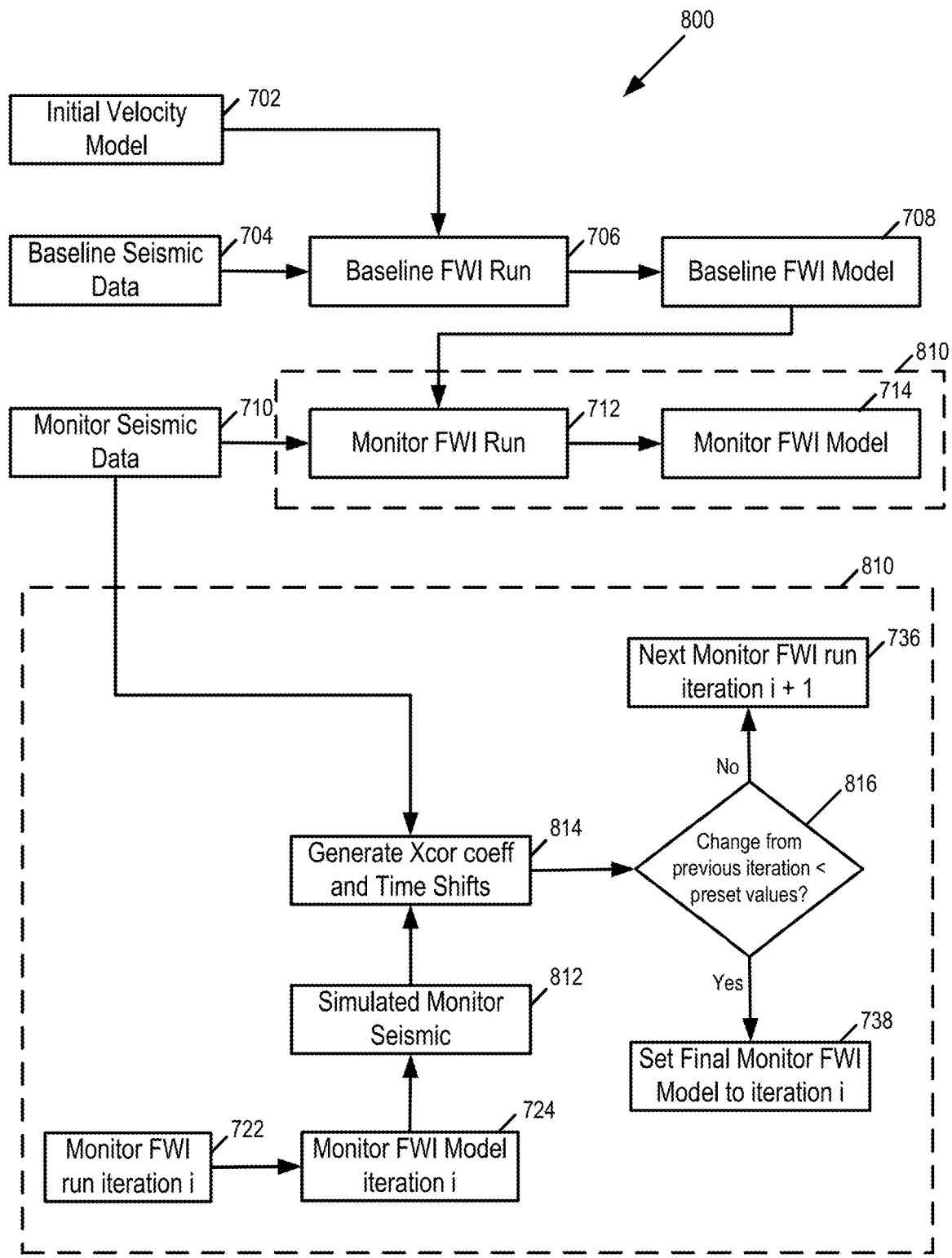
FIG. 8 illustrates a flow diagram for determining convergence based on the maximum values of cross-correlation coefficients and time shifts between input field seismic gathers and FWI simulated gathers.

FIG. 8 illustrates a flow diagram 800 for determining convergence based on the maximum values of cross-correlation coefficients and time shifts between input field gathers and FWI simulated gathers. FIG. 8 shows a sequential difference 4D FWI workflow, such as illustrated in FIG. 2. The lower part of the figure is an expansion of block 810, which includes the determination of convergence. At 722, the monitor FWI run for iteration i is performed in order to generate at 724 monitor FWI model for iteration i. The monitor FWI model for iteration i is then used to generate simulated monitor seismic data at 812. At 814, the simulated monitor seismic data and the actual monitor seismic data (from monitor seismic data 710) are input to generate cross correlation coefficients and/or time shifts (TS). Thus, time shifts between the corresponding gathers may be calculated so that the cross-correlation coefficients are maximized. The maximum cross-correlation coefficients ($f_{xc}$(xcoef_background), $f_{xc}$(xcoef_target)) and time shifts ($f_{xc}$(TS_background), $f_{xc}$(TS_target)) of the target reservoir region and background region may be tracked for each FWI iteration.

Convergence may thus be identified when there is no significant change in the time shifts and cross-correlation coefficients for the target reservoir region and background region. In this regard, at 816, it is determined whether one or both of the time shifts and cross-correlation coefficients (as changed from the previous iteration) is less than preset value(s). A change from the previous iteration of one or both of the time shifts and cross-correlation coefficients that is less than the preset value(s) may indicate convergence. If so, it is determined that convergence has occurred (a "yes" determination from block 816), so that at 738 iteration ends and the final monitor FWI model is set to iteration i. If not, it is determined that convergence has not occurred (a "no" determination from block 816), so that at 736, iteration continues and the next monitor FWI run of iteration i+1 is performed.

Figure 9A:
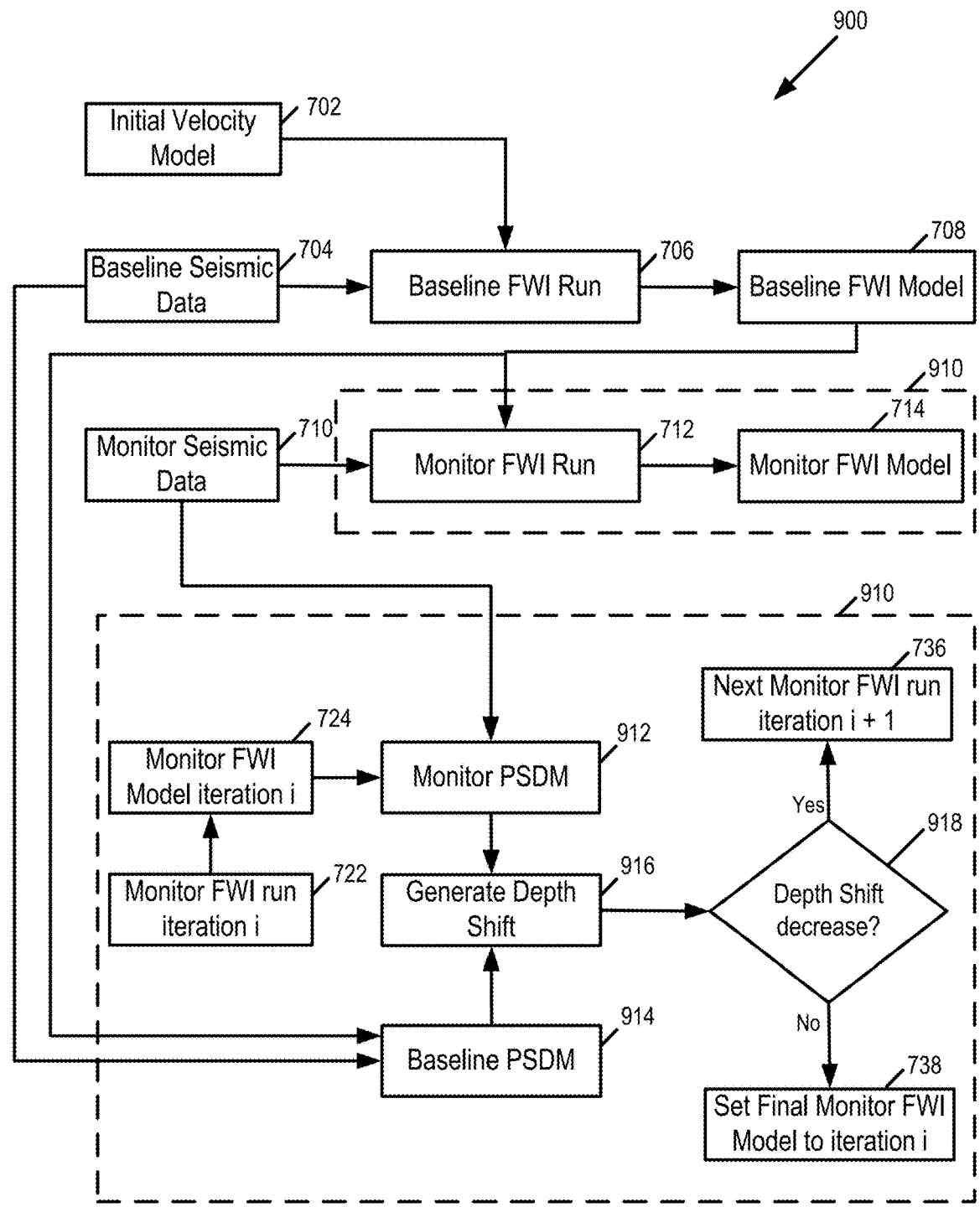
FIG. 9A illustrates a flow diagram for determining convergence based on the depth shift between stacks of monitor and baseline seismic data migrated with the corresponding FWI monitor and baseline models.

FIG. 9A illustrates a flow diagram 900 for determining convergence based on the depth shift between stacks of monitor and baseline seismic data migrated with the corresponding FWI monitor and baseline models. FIG. 9A shows a sequential difference 4D FWI workflow, such as illustrated in FIG. 2. The lower part of the figure is an expansion of block 910, which includes the determination of convergence.

As illustrated in FIG. 9A, the prestack depth migrations (PSDM) are performed on the baseline seismic data and the monitor seismic data. The baseline seismic data are migrated with the baseline FWI model (as shown by the inputs to block 914) to generate the baseline PSDM at 914. The monitor seismic data are migrated with the monitor FWI model from each FWI iteration run (iteration i) (as shown by the inputs to block 912) to generate the monitor PSDM at 912. At 916, the depth shifts are calculated between the migrated monitor image and the migrated baseline image. With each FWI iteration run on the monitor data, the depth shifts may decrease. Convergence may be identified when the depth shifts reach minimum values (e.g., the depth shift decreases have stabilized sufficiently so that the depth shift decrease is less than a predetermined amount) or when the ratio between the RMS of the depth shifts in the reservoir region and that outside the reservoir region is within a predetermined tolerance of the target value. Thus, at 918, it is determined whether the depth shifts have decreased by a certain amount. If not, it is determined that convergence has occurred (a "no" determination from block 918), so that at 738 iteration ends and the final monitor FWI model is set to iteration i. If yes, it is determined that convergence has not occurred (a "yes" determination from block 918), so that at 736, iteration continues and the next monitor FWI run of iteration i+1 is performed. Separation of depth shifts in the target reservoir region and the background region may thus be used as an indicator to determine whether to restrict the region for further FWI iterations.

Figure 9B:
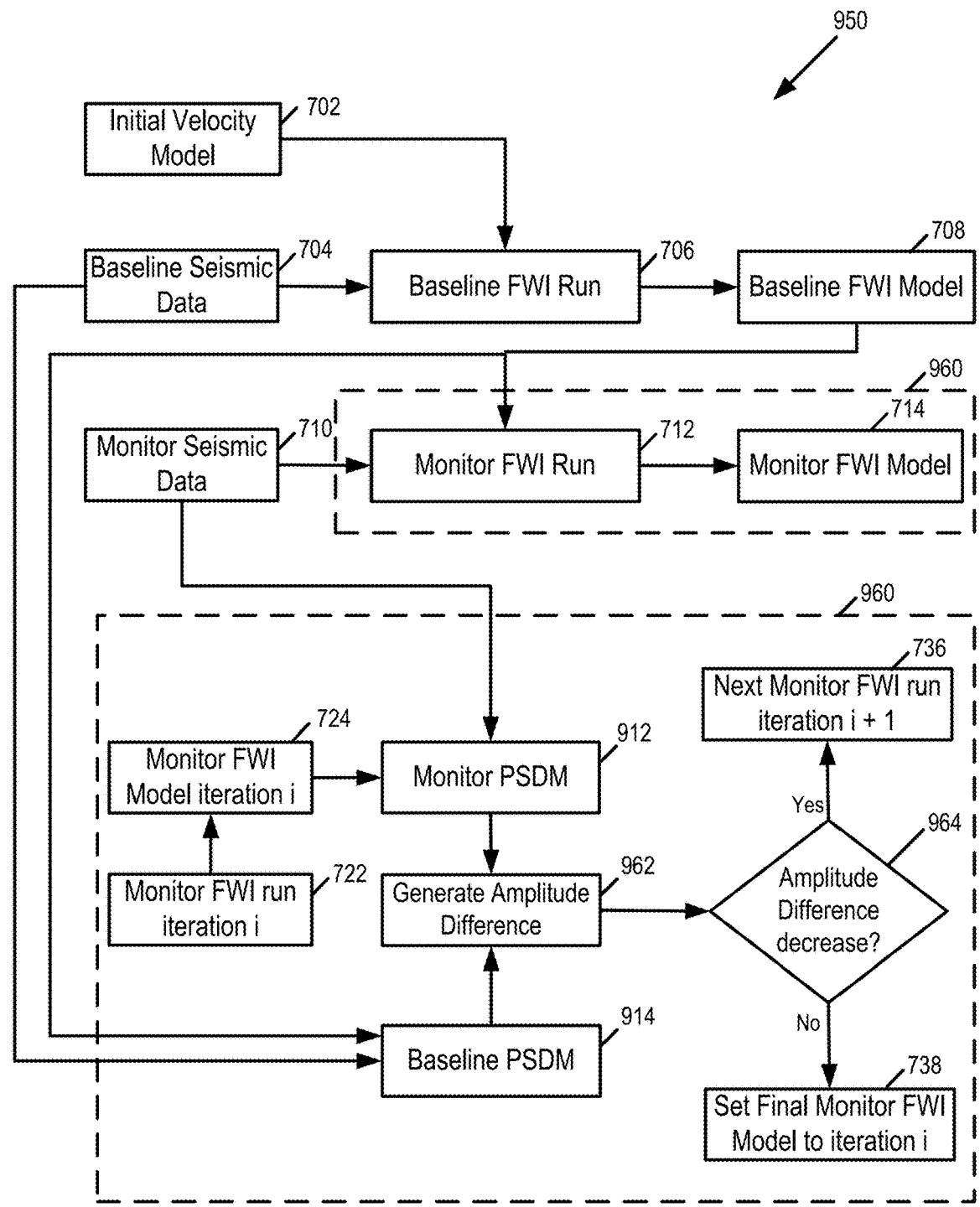
FIG. 9B illustrates a flow diagram for determining convergence based on the amplitude difference between stacks of monitor and baseline seismic data migrated with the corresponding FWI monitor and baseline models.

FIG. 9B illustrates a flow diagram 950 for determining convergence based on the amplitude difference between stacks of monitor and baseline seismic data migrated with the corresponding FWI monitor and baseline models. FIG. 9B shows a sequential difference 4D FWI workflow, such as illustrated in FIG. 2. The lower part of the figure is an expansion of block 960, which includes the determination of convergence. Unlike FIG. 9A, FIG. 9B generates, using the baseline PSDM and the monitor PSDM, the amplitude difference at 962. Similar to the depth shifts, with each FWI iteration run on the monitor data, the amplitude differences decrease, so that convergence may be identified when the amplitude difference reaches minimum values (e.g., the amplitude difference decreases have stabilized sufficiently so that the amplitude difference decrease is less than a predetermined amount). Similarly, RMS of the amplitude difference can be computed for the reservoir region and outside the reservoir region and their ratio can be used to determine convergence. Thus, at 964, it is determined whether the amplitude difference has decreased by a certain amount. If not, it is determined that convergence has occurred (a "no" determination from block 964), so that at 738 iteration ends and the final monitor FWI model is set to iteration i. If yes, it is determined that convergence has not occurred (a "yes" determination from block 964), so that at 736, iteration continues and the next monitor FWI run of iteration i+1 is performed.

Thus, FIGS. 9A-B illustrate additional examples of the quantitative representation of the convergence criterion, whereby the baseline seismic data was migrated with the baseline FWI model and monitor seismic data migrated with the monitor FWI model, depth or time shifts between the migrated baseline seismic image and monitor seismic image were calculated. The convergence may be determined by comparing the depth or time shifts between the consecutive 4D FWI iterations inside the reservoir region and outside the reservoir region.

Figure 10:
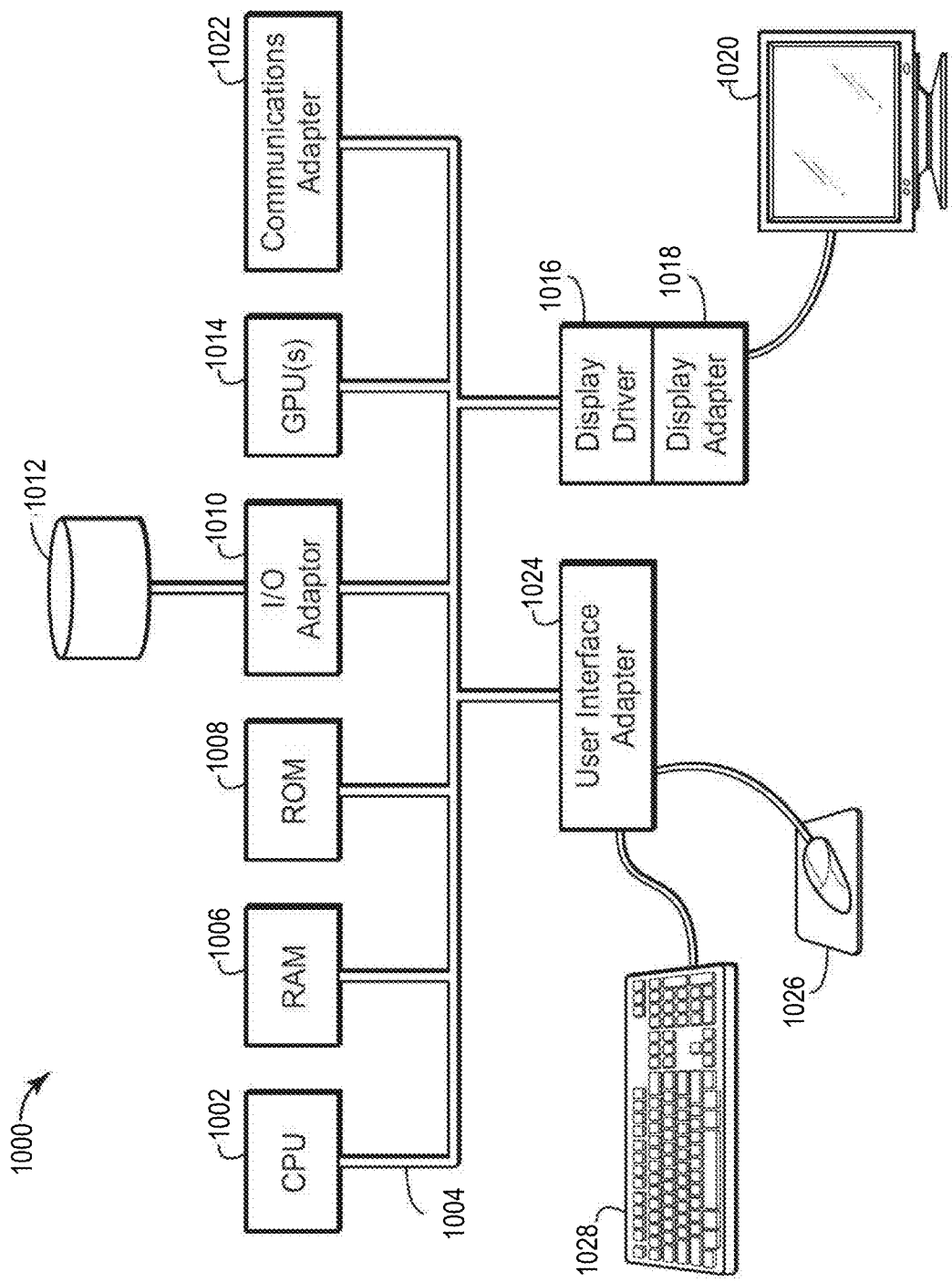
FIG. 10 is a diagram of an exemplary computer system that may be utilized to implement the methods described herein.

In all practical applications, the present technological advancement must be used in conjunction with a computer, programmed in accordance with the disclosures herein. For example, FIG. 10 is a diagram of an exemplary computer system 1000 that may be utilized to implement methods described herein. A central processing unit (CPU) 1002 is coupled to system bus 1004. The CPU 1002 may be any general-purpose CPU, although other types of architectures of CPU 1002 (or other components of exemplary computer system 1000) may be used as long as CPU 1002 (and other components of computer system 1000) supports the operations as described herein. Those of ordinary skill in the art will appreciate that, while only a single CPU 1002 is shown in FIG. 10, additional CPUs may be present. Moreover, the computer system 1000 may comprise a networked, multi-processor computer system that may include a hybrid parallel CPU/GPU system. The CPU 1002 may execute the various logical instructions according to various teachings disclosed herein. For example, the CPU 1002 may execute machine-level instructions for performing processing according to the operational flow described.

The computer system 1000 may also include computer components such as non-transitory, computer-readable media. Examples of computer-readable media include a random access memory (RAM) 1006, which may be SRAM, DRAM, SDRAM, or the like. The computer system 1000 may also include additional non-transitory, computer-readable media such as a read-only memory (ROM) 1008, which may be PROM, EPROM, EEPROM, or the like. RAM 1006 and ROM 1008 hold user and system data and programs, as is known in the art. The computer system 1000 may also include an input/output (I/O) adapter 1010, a graphics processing unit (GPU) 1014, a communications adapter 1022, a user interface adapter 1024, a display driver 1016, and a display adapter 1018.

The I/O adapter 1010 may connect additional non-transitory, computer-readable media such as storage device(s) 1012, including, for example, a hard drive, a compact disc (CD) drive, a floppy disk drive, a tape drive, and the like to computer system 1000. The storage device(s) may be used when RAM 1006 is insufficient for the memory requirements associated with storing data for operations of the present techniques. The data storage of the computer system 1000 may be used for storing information and/or other data used or generated as disclosed herein. For example, storage device(s) 1012 may be used to store configuration information or additional plug-ins in accordance with the present techniques. Further, user interface adapter 1024 couples user input devices, such as a keyboard 1028, a pointing device 1026 and/or output devices to the computer system 1000. The display adapter 1018 is driven by the CPU 1002 to control the display on a display device 1020 to, for example, present information to the user such as subsurface images generated according to methods described herein.

The architecture of computer system 1000 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1000 may include various plug-ins and library files. Input data may additionally include configuration information.

Preferably, the computer is a high-performance computer (HPC), known to those skilled in the art. Such high-performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray, IBM, or other manufacturers.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

The following example embodiments of the invention are also disclosed.

Embodiment 1: A computer-implemented method for iteratively inverting geophysical data to generate a model difference of physical properties representative of a subsurface region, the method comprising: inverting, with at least one computer, the geophysical data in order to generate the model difference; determining, using a transform of a first region of the model difference and a transform of a second region of the model difference, a convergence criterion, the first region and the second region not being coextensive; analyzing, with the at least one computer, the convergence criterion; determining, with the at least one computer and based on the analysis of the convergence criterion, whether to continue iterating the inversion for the model difference; in response to determining to continue iterating the inversion for the model difference, continuing, with the at least one computer, iteratively performing inversion in order to generate one or more updated model differences; and in response to determining to stop iterating, stopping to iteratively invert for the model difference.

Embodiment 2: The method of embodiment 1, wherein the geophysical data comprises seismic data; wherein the inversion is full wavefield inversion; and wherein the model difference comprises a difference between a monitor model and a baseline model.

Embodiment 3: The method of any of embodiments 1 and 2, wherein the first region and the second region are mutually exclusive.

Embodiment 4: The method of any of embodiments 1-3, wherein the first region comprises a target reservoir region defined as including hydrocarbon production and the second region is defined as a background region outside of the target reservoir region.

Embodiment 5: The method of any of embodiments 1-4, wherein a monitor full wavefield inversion (FWI) model is generated using sequential difference FWI by generating an initial monitor FWI model based on a baseline FWI model.

Embodiment 6: The method of any of embodiments 1-5, wherein the seismic data comprise seismic surveys acquired at different times in order to generate baseline seismic data and monitor seismic data, respectively; wherein the target reservoir region is defined based on the baseline seismic data and the monitor seismic data; wherein a baseline FWI model is generated based on the baseline seismic data; wherein a monitor FWI model is generated based on the monitor seismic data; and wherein the convergence criterion is determined based on transforms of the baseline FWI model and the monitor FWI model in the target reservoir region and the background region in combination.

Embodiment 7: The method of any of embodiments 1-6, wherein the target reservoir region is defined based on data generated from at least one of exploration, development or production of hydrocarbon.

Embodiment 8: The method of any of embodiments 1-7, wherein determining the convergence criterion is based on a differential model between a current iteration of the monitor FWI model and the baseline FWI model for the target reservoir region and the background region.

Embodiment 9: The method of any of embodiments 1-8, wherein the convergence criterion comprises a ratio of a root mean square of the differential model for the target reservoir region and a root mean square of the differential model for the background region; and wherein determining whether to continue iterating is based on analysis of the ratio.

Embodiment 10: The method of any of embodiments 1-9, wherein determining whether to continue iterating is based on whether the ratio is approaching a predetermined value.

Embodiment 11: The method of any of embodiments 1-10, wherein the seismic data comprise seismic surveys acquired at different times in order to generate baseline seismic data and monitor seismic data, respectively; wherein a baseline FWI model is generated based on the baseline seismic data; wherein a monitor FWI model is generated based on the monitor seismic data; wherein the convergence criterion is based on simulated data generated by the monitor FWI model and the baseline FWI model for the target reservoir region and for the background region; wherein analyzing the convergence criterion comprises: comparing the seismic data for the target reservoir region with the simulated data generated by the monitor FWI model and the baseline FWI model for the target reservoir region in order to generate a target reservoir region comparison; comparing the seismic data for the background region with the simulated data generated by the monitor FWI model and the baseline FWI model for the background region in order to generate a background region comparison; and comparing the target reservoir region comparison with the background region comparison.

Embodiment 12: The method of any of embodiments 1-11, wherein the convergence criterion comprises cross-correlation coefficients and time shifts between input field gathers and FWI simulated gathers; and wherein determining whether to continue iterating comprises; determining whether the differences in the cross-correlation coefficients and the time shifts between input field gathers and FWI simulated gathers for the target reservoir region and the background region in a current iteration of the model difference is less, by a predetermined amount, than the differences in the cross-correlation coefficients and the time shifts between input field gathers and FWI simulated gathers for the target reservoir region and the background region in a previous iteration of the model difference; and responsive to determining that the change is less than the predetermined amount, stopping iteratively inverting for the model difference.

Embodiment 13: The method of any of embodiments 1-12, wherein the seismic data comprise seismic surveys acquired at different times in order to generate baseline seismic data and monitor seismic data, respectively; wherein a baseline FWI model is generated based on the baseline seismic data; wherein a monitor FWI model is generated based on the monitor seismic data; wherein the convergence criterion is based on: target prestack depth migrations (PSDM) using the baseline seismic data and the baseline FWI model for the target reservoir region and using the monitor seismic data and the monitor FWI model for the target reservoir region; and background PSDM using the baseline seismic data and the baseline FWI model for the background region and using the monitor seismic data and the monitor FWI model for the background region; wherein one or both of depth shift or amplitude difference is calculated based on the target PSDM and the background PSDM; and wherein determining whether to continue iterating the model difference is based on analysis of the one or both of the depth shift or the amplitude difference.

Embodiment 14: The method of any of embodiments 1-13, wherein the geophysical data comprise seismic surveys acquired at different times in order to generate baseline seismic data and monitor seismic data, respectively; wherein a baseline FWI model is generated based on the baseline seismic data; wherein a monitor FWI model is generated based on the monitor seismic data; and wherein iteratively performing inversion comprises iteratively inverting a difference between the monitor FWI model and the baseline FWI model.

Embodiment 15: The method of any of embodiments 1-14, wherein the first region comprises a target reservoir region defined as including hydrocarbon production and the second region is defined as a background region outside of the target reservoir region; wherein the convergence criterion is based on a transform of the model difference of the target reservoir region and a transform of the model difference of the background region; and wherein the transform of the model difference of the background region stabilizes quicker between iterations than the transform of model difference of the target reservoir region.

Embodiment 16: The method of any of embodiments 1-15, wherein determining whether to continue iterating comprises determining whether the convergence criterion exhibits a predetermined relationship that is indicative of convergence of the model.

Embodiment 17: The method of any of embodiments 1-16, wherein determining whether to continue iterating comprising comparing the convergence criterion in a current iteration with the convergence criterion in a previous iteration.

Embodiment 18: The method of any of embodiments 1-17, wherein comparing the convergence criterion in the current iteration with the convergence criterion in the previous iteration comprises generating, based on the convergence criterion in the current iteration and the convergence criterion in the previous iteration, an indication of change between iterations; and wherein determining whether to continue iterating is based on the indication of change between iterations.

Embodiment 19: The method of any of embodiments 1-18, wherein determining whether to continue iterating is based on comparing the convergence criterion with a predetermined value.

Embodiment 20: The method of any of embodiments 1-19, wherein the first region comprises a target reservoir region defined as including hydrocarbon production and the second region is defined as a background region outside of the target reservoir region; and wherein, responsive to analyzing a rate of change of the transform of the model difference of the background region, ceasing to calculate the transform for the model difference of the background region while still calculating the transform for the model difference of the target reservoir region.

Embodiment 21: The method of any of embodiments 1-19, wherein iteratively performing inversion generates the updated baseline model and the updated monitor model in order to generate the updated model difference.

Embodiment 22: The method of any of embodiments 1-19, wherein iteratively performing inversion generates the updated model difference.

Embodiment 23: A non-transitory computer readable storage medium encoded with instructions, which when executed by a computer cause the computer to implement a method according to any one of embodiments 1-22.

Embodiment 24: A system, comprising: one or more processors, the one or more processors programmed to perform a method according to any one of embodiments 1-22.

REFERENCES

The following references are hereby incorporated by reference herein in their entirety:

Chen, G., P. Routh, A. Mullur, P. Singh, X. Lu, M. Helgerud, S. Lazaratos, S. Adamson, D. Johnston, and S. Zantout, 2015, Application of full wavefield inversion to deepwater 4D seismic surveys—workflow and analysis of the results, Tu N101 11, 77$^{th}$ EAGE Conference and Exhibition 2015, IFEMA, Madrid, Spain, Jun. 1-4, 2015.

Johnston, D. H., 2013, Practical applications of time-lapse seismic data: 2013 Distinguished Instructor Short Course, Society of Exploration Geophysics, ISBN 156080307X, 9781560803072, pp. 4-8.

Lazaratos, S., I. Chikichev, and K. Wang, 2011, Improving the convergence rate of full wavefield inversion using spectral shaping: 81st Annual International Meeting, SEG, Technical Program Expanded Abstracts, doi:10.1190/1.3627696, pp. 2428-2432.

Maharramov, M., and B. L. Biondi, 2014, Joint Full-waveform Inversion of Time-lapse Seismic Data Sets: 84$^{th}$ Annual International Meeting, SEG, Expanded Abstracts, pp. 954-959.

Maharramov, M., B. L. Biondi, and M. A. Meadows, 2016, Time-lapse inverse theory with applications: Geophysics, vol. 81, pp. R485-R501.

Plessix, R-É., and Y. Li, 2013, Waveform acoustic impedance inversion with spectral shaping: Geophysical Journal International, vol. 195, pp. 301-314.

Routh, P., G. Palacharla, I. Chikichev and S. Lazaratos, 2012, Full Wavefield Inversion of Time-Lapse Data for Improved Imaging and Reservoir Characterization: SEG Technical Program Expanded Abstracts 2012, DOI: 10.1190/segam2012-1043.1, pp. 1-6.

Zhan, X., D. Chu, B. Wheelock, D. Johnston, K. Bandyopadhyay, and D. McAdow, 2017, 4D time shift and amplitude versus offset joint (AVO) inversion: SEG Technical Program Expanded Abstracts 2017, pp. 5855-5859.

The invention claimed is:

1. A computer-implemented method for iteratively inverting geophysical data to generate a baseline model, a monitor model, and a model difference of physical properties representative of a subsurface region, the method comprising:
    inverting, with at least one computer, the geophysical data in order to generate the baseline model, the monitor model, and the model difference;
    determining, using a transform of a first region of the model difference and a transform of a second region of the model difference, a convergence criterion, the first region and the second region not being coextensive;
    analyzing, with the at least one computer, the convergence criterion;
    determining, with the at least one computer and based on the analysis of the convergence criterion, whether to continue iterating the inversion for the model difference;
    in response to determining to continue iterating the inversion for the model difference, continuing, with the at least one computer, iteratively performing inversion in order to generate one or more of an updated baseline model, an updated monitor model, or an updated model difference;
    in response to determining to stop iterating, stopping to iteratively invert for the model difference, wherein the model difference corresponds to changes in physical properties representative of the subsurface region; and
    using the model difference in hydrocarbon management of the subsurface region.

2. The method of claim 1, wherein the geophysical data comprises seismic data;
    wherein the inversion is full wavefield inversion (FWI); and
    wherein the model difference comprises a difference between a monitor model and a baseline model.

3. The method of claim 2, wherein the first region and the second region are mutually exclusive.

4. The method of claim 3, wherein the first region comprises a target reservoir region defined as including hydrocarbon production and the second region is defined as a background region outside of the target reservoir region.

5. The method of claim 4, wherein a monitor full wavefield inversion (FWI) model is generated using sequential difference FWI by generating an initial monitor FWI model based on a baseline FWI model.

6. The method of claim 4, wherein the seismic data comprise seismic surveys acquired at different times in order to generate baseline seismic data and monitor seismic data, respectively;
    wherein the target reservoir region is defined based on the baseline seismic data and the monitor seismic data;
    wherein a baseline FWI model is generated based on the baseline seismic data;
    wherein a monitor FWI model is generated based on the monitor seismic data; and
    wherein the convergence criterion is determined based on transforms of the target reservoir region and the background region of the baseline FWI model and the monitor FWI model in combination.

7. The method of claim 6, wherein the target reservoir region is defined based on data generated from at least one of exploration, development or production of hydrocarbon.

8. The method of claim 6, wherein determining the convergence criterion is based on a differential model between a current iteration of the monitor FWI model and the baseline FWI model for the target reservoir region and the background region.

9. The method of claim 8, wherein the convergence criterion comprises a ratio of a root mean square of the differential model for the target reservoir region and a root mean square of the differential model for the background region; and
    wherein determining whether to continue iterating is based on analysis of the ratio.

10. The method of claim 9, wherein determining whether to continue iterating is based on whether the ratio is approaching a predetermined value.

11. The method of claim 4, wherein the seismic data comprise seismic surveys acquired at different times in order to generate baseline seismic data and monitor seismic data, respectively;
    wherein a baseline FWI model is generated based on the baseline seismic data;
    wherein a monitor FWI model is generated based on the monitor seismic data;
    wherein the convergence criterion is based on simulated data generated by the monitor FWI model and the baseline FWI model for the target reservoir region and for the background region;
    wherein analyzing the convergence criterion comprises:
        comparing the seismic data for the target reservoir region with the simulated data generated by the monitor FWI model for the target reservoir region in order to generate a target reservoir region comparison;
        comparing the seismic data for the background region with the simulated data generated by the monitor FWI model for the background region in order to generate a background region comparison; and
        comparing the target reservoir region comparison with the background region comparison.

12. The method of claim 11, wherein the convergence criterion comprises cross-correlation coefficients and time shifts between input field gathers and FWI simulated gathers; and
    wherein determining whether to continue iterating comprises;
        determining whether a change in the cross-correlation coefficients and the time shifts between input field gathers and FWI simulated gathers for the target reservoir region and the background region in a current iteration of the model difference is less, by a predetermined amount, than the cross-correlation coefficients and the time shifts between input field gathers and FWI simulated gathers for the target reservoir region and the background region in a previous iteration of the model difference; and responsive to determining that the change is less than the predetermined amount, stopping iteratively inverting for the model difference.

13. The method of claim 4, wherein the seismic data comprise seismic surveys acquired at different times in order to generate baseline seismic data and monitor seismic data, respectively;
wherein a baseline FWI model is generated based on the baseline seismic data;
wherein a monitor FWI model is generated based on the monitor seismic data;
wherein the convergence criterion is based on:
target prestack depth migrations (PSDM) using the baseline seismic data and the baseline FWI model for the target reservoir region and using the monitor seismic data and the monitor FWI model for the target reservoir region; and
background PSDM using the baseline seismic data and the baseline FWI model for the background region and using the monitor seismic data and the monitor FWI model for the background region;
wherein one or both of depth shift or amplitude difference is calculated based on the target PSDM and the background PSDM; and
wherein determining whether to continue iterating the model difference is based on analysis of the one or both of the depth shift or the amplitude difference.

14. The method of claim 1, wherein the geophysical data comprise seismic surveys acquired at different times in order to generate baseline seismic data and monitor seismic data, respectively;
wherein a baseline full wavefield inversion (FWI) model is generated based on the baseline seismic data;
wherein a monitor FWI model is generated based on the monitor seismic data; and
wherein iteratively performing inversion comprises iteratively inverting a difference between the monitor FWI model and the baseline FWI model.

15. The method of claim 1, wherein the first region comprises a target reservoir region defined as including hydrocarbon production and the second region is defined as a background region outside of the target reservoir region;
wherein the convergence criterion is based on a transform of the target reservoir region and a transform of the background region; and
wherein the transform of the background region stabilizes quicker between iterations than the transform of the target reservoir region.

16. The method of claim 15, wherein determining whether to continue iterating comprises determining whether the convergence criterion exhibits a predetermined relationship that is indicative of convergence of the model difference.

17. The method of claim 16, wherein determining whether to continue iterating comprising comparing the convergence criterion in a current iteration with the convergence criterion in a previous iteration.

18. The method of claim 17, wherein comparing the convergence criterion in the current iteration with the convergence criterion in the previous iteration comprises generating, based on the convergence criterion in the current iteration and the convergence criterion in the previous iteration, an indication of change between iterations; and
wherein determining whether to continue iterating is based on the indication of change between iterations.

19. The method of claim 16, wherein determining whether to continue iterating is based on comparing the convergence criterion with a predetermined value.

20. The method of claim 15, wherein the first region comprises a target reservoir region defined as including hydrocarbon production and the second region is defined as a background region outside of the target reservoir region; and
wherein, responsive to analyzing a rate of change of the transform of the background region, ceasing to calculate the transform for the background region while still calculating the transform for the target reservoir region.

21. The method of claim 1, wherein iteratively performing inversion generates the updated baseline model and the updated monitor model in order to generate the updated model difference.

22. The method of claim 1, wherein iteratively performing inversion generates the updated model difference.

* * * * *